(12) United States Patent
Vacca et al.

(10) Patent No.: US 11,125,227 B2
(45) Date of Patent: Sep. 21, 2021

(54) PRESSURE COMPENSATED EXTERNAL GEAR MACHINE

(71) Applicant: Purdue Research Foundation, West Lafayette, IN (US)

(72) Inventors: Andrea Vacca, Lafayette, IN (US); Sujan Dhar, Seattle, WA (US); Divya Thiagarajan, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 208 days.

(21) Appl. No.: 15/999,459

(22) PCT Filed: Feb. 21, 2017

(86) PCT No.: PCT/US2017/018722
§ 371 (c)(1),
(2) Date: Aug. 17, 2018

(87) PCT Pub. No.: WO2017/143340
PCT Pub. Date: Aug. 24, 2017

(65) Prior Publication Data
US 2020/0088285 A1    Mar. 19, 2020

Related U.S. Application Data

(60) Provisional application No. 62/296,670, filed on Feb. 18, 2016.

(51) Int. Cl.
*F03C 2/00* (2006.01)
*F03C 4/00* (2006.01)
(Continued)

(52) U.S. Cl.
CPC .............. *F04C 2/082* (2013.01); *F04C 2/084* (2013.01); *F16H 1/06* (2013.01); *F16H 55/17* (2013.01);
(Continued)

(58) Field of Classification Search
CPC .. F04C 2/082; F04C 2/084; F04C 2/10; F04C 2/102; F04C 2240/56; F01C 21/02;
(Continued)

(56) References Cited

U.S. PATENT DOCUMENTS 2,022,610 A    11/1935  Wendell
2,891,483 A *  6/1959  Murray ............... F04C 15/0026
                                                        418/132

(Continued)

OTHER PUBLICATIONS

International Searching Authority, International Search Report, PCT Patent Application Serial No. PCT/US17/18722, dated May 16, 2017.

(Continued)

*Primary Examiner* — Theresa Trieu
(74) *Attorney, Agent, or Firm* — Reichel Stohry Dean LLP; Natalie J. Dean

(57) ABSTRACT

Devices and systems relating to external gear machines that comprise microsurface shaping on the lateral surfaces of the gear teeth and/or bushing surfaces are provided. Such microsurface shaping may comprise a flat step to linear wedge profile, a flat step to flat step profile, or solely a linear wedge profile. The incorporation of microsurface shaping on the gear teeth and/or bushing plates contributes to improving the lubrication performance within the external gear machine and provides significant benefits, including the improvement of operating efficiency, life, and reliability of the system components. Methods for manufacturing the gear teeth and related bushings are also provided, the methods configured to optimize the overall axial balance within the system.

22 Claims, 11 Drawing Sheets

(51) Int. Cl.
*F04C 18/00* (2006.01)
*F04C 2/00* (2006.01)
*F04C 2/08* (2006.01)
*F16H 1/06* (2006.01)
*F16H 55/17* (2006.01)
*F01C 21/02* (2006.01)
*F16C 33/10* (2006.01)

(52) U.S. Cl.
CPC .......... *F01C 21/02* (2013.01); *F04C 2240/56* (2013.01); *F16C 33/106* (2013.01); *F16C 33/1025* (2013.01)

(58) Field of Classification Search
CPC ... F16H 1/04; F16H 1/06; F16H 55/17; F16C 17/02; F16C 17/028; F16C 17/047; F16C 17/26; F16C 33/1025; F16C 33/103; F16C 33/1045; F16C 33/106; F16C 33/1075
See application file for complete search history.

(56) References Cited

U.S. PATENT DOCUMENTS

| | | | |
|---|---|---|---|
| 4,548,531 A | 10/1985 | Seitelman et al. | |
| 4,777,838 A | 10/1988 | Aarestad | |
| 5,641,281 A * | 6/1997 | Russell | F04C 2240/56 418/206.7 |
| 6,230,578 B1 | 5/2001 | Kim et al. | |
| 6,390,793 B1 | 5/2002 | Sweet et al. | |
| 2007/0137355 A1 | 6/2007 | Ohmi et al. | |
| 2008/0236320 A1 | 10/2008 | Takumori | |
| 2016/0123390 A1* | 5/2016 | Kovach | F04C 2240/56 418/206.7 |
| 2016/0369795 A1* | 12/2016 | Vacca | F04C 14/18 418/21 |

OTHER PUBLICATIONS

International Searching Authority, Written Opinion of the International Searching Authority, PCT Patent Application Serial No. PCT/US17/18722, dated May 16, 2017.

Thiagarajan et al.,"Improvement of Lubrication Performance in External Gear Machines through Micro-Surface Wedged Gears," Tribology Transactions, accepted author version posted online Apr. 16, 2016, published online Aug. 3, 2016, USA.

* cited by examiner

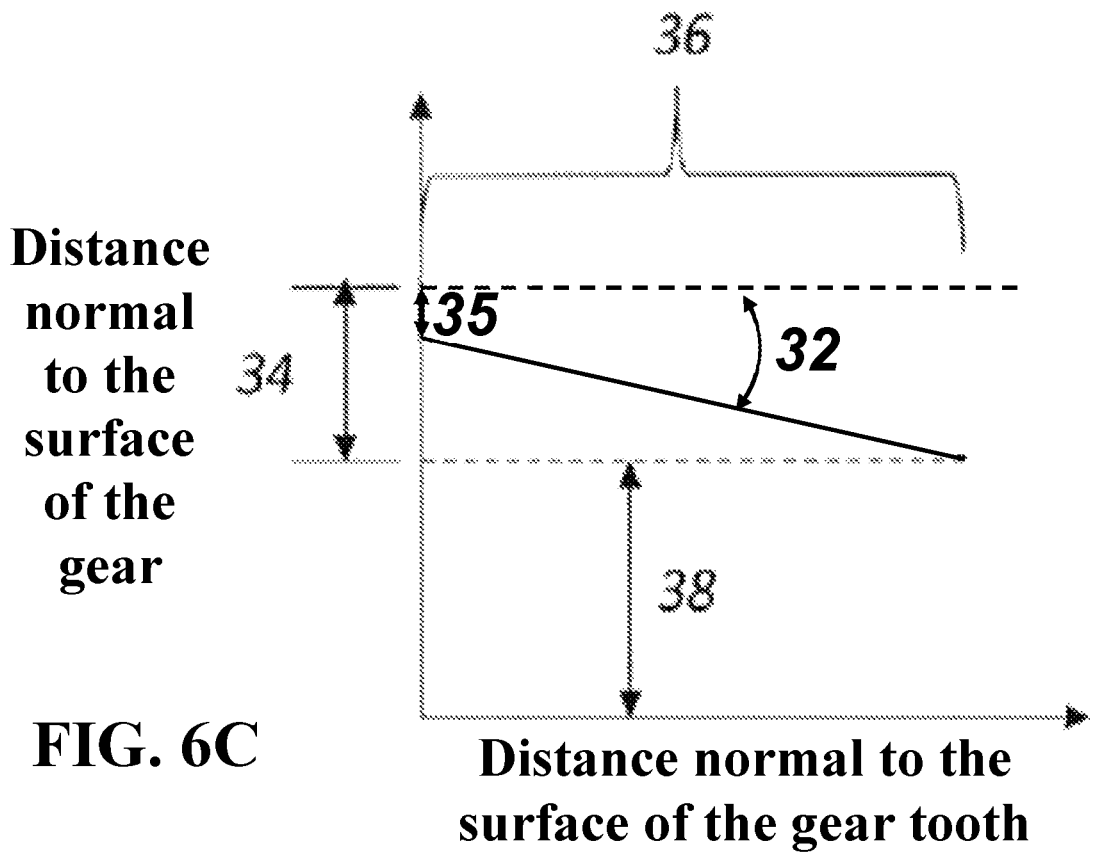
FIG. 6C
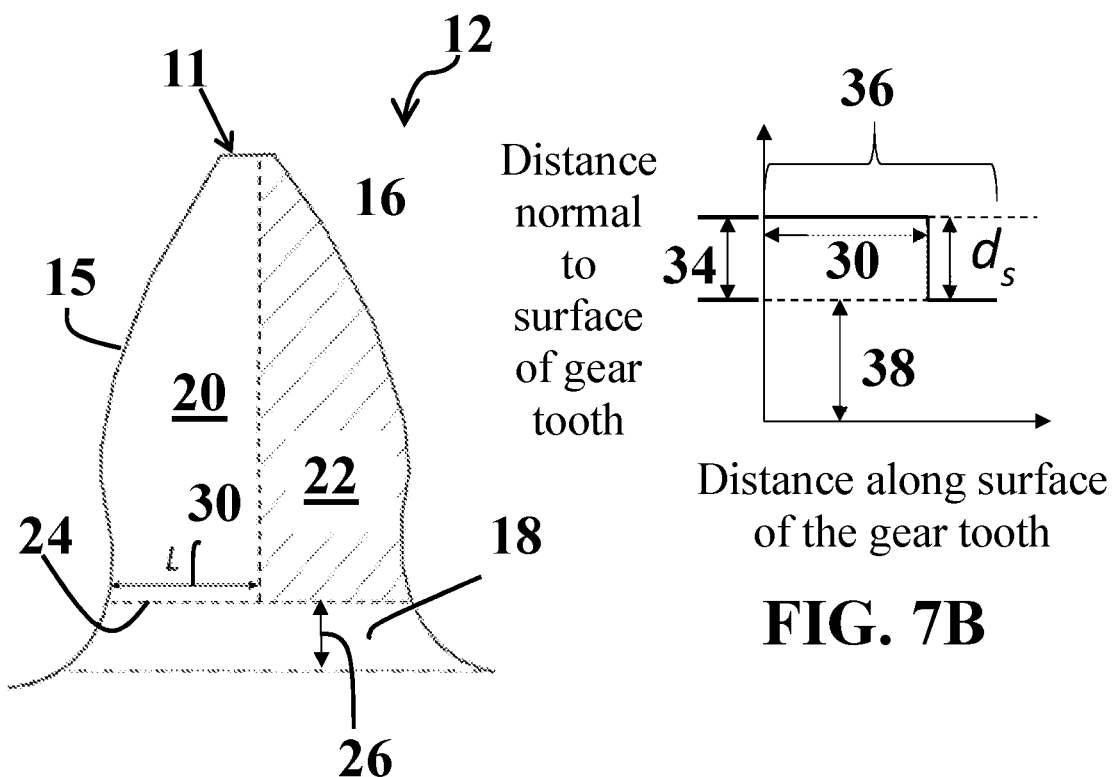
FIG. 7A
FIG. 7B

PRESSURE COMPENSATED EXTERNAL GEAR MACHINE

PRIORITY

The present application is related to, claims the priority benefit of, and is a 35 U.S.C. 371 national stage application of International Patent Application Serial No. PCT/US2017/018722 to Vacca et al., filed Feb. 21, 2017, which is related to, and claims the priority benefit of, U.S. Provisional Patent Application Ser. No. 62/296,670 to Vacca et al., filed on Feb. 18, 2016. The contents of each of the aforementioned applications are hereby expressly incorporated by reference in their entirety into this disclosure.

STATEMENT REGARDING FEDERALLY SPONSORED RESEARCH OR DEVELOPMENT

This invention was made with government support under Contract No. 2013-67021-21102 awarded by the U.S. Department of Agriculture. The United States Government has certain rights in the invention.

BACKGROUND

External gear machines (EGMs) are used in various applications, including aerospace, automotive, construction, agriculture and earthmoving industries among others. EGMs are often used in high pressure applications such as lubrication pumps in machine tools, in fluid power transfer units, and as oil pumps in engines. The wide use of these units is primarily attributed to their compactness and relatively low cost, owing (at least in part) to the presence of relatively few internal components.

EGMs typically comprise at least a single set of gears positioned to rotate against each other (i.e. come into and out of mesh) (see FIGS. 1 and 2A, generally, with gears 110, 112). EGMs also have shaft support extending axially from both sides of the gears that may also have bearings associated therewith. At least one of the gears may be driven by a motor (via the shaft support or otherwise) which, in turn, drives the other gear (i.e. a slave gear), as applicable. The gears and shaft are typically surrounded by an external casing that defines a cavity in which the gears are positioned at close tolerance and two ports, one adjacent to each gear. As described in further detail below, balancing areas positioned on or adjacent to the bushings may also be used to assist with balancing the pressure forces generated within the EGM.

Pressure-compensated designs of EGMs, which are typical for high pressure applications (up to 350 bar), include floating lateral bushing plates (see, e.g., bushing plates 120 of FIG. 2A). In such applications, a lateral bushing plate is positioned between each gear and its adjacent bearing such that a lateral lubricating interface or gap is formed between the two components (see lubricating gaps 114, the size of which are exaggerated in FIG. 2A to relate the concept). These lateral lubricating interfaces/gaps are intended to assist with the high pressure loads and prevent/reduce frictional loss between the operating components, and also act to seal the tooth space volumes. However, preventing frictional losses and sealing gaps often entail opposing design aims and, if the lateral lubricating interface design fails to satisfy either, the reliability and operating life of the machine can be compromised. As such, design parameters for achieving an optimal lateral lubrication interface have been long sought after.

Conventional EGM designs experience significant wear especially when operating under severe conditions (such as low shaft speeds and high operating pressures), with wear being dependent on the chances of contact between the gears and the lateral bushings. The gears and lateral bushings, the major solid components that form the lateral lubricating gaps, conventionally have flat, smooth surfaces (barring wear patterns). The flat surfaces of the gears and lateral bushings do not provide any additional aid in achieving optimal gap conditions through contributing additional hydrodynamic effects. Accordingly, EGM design has typically attempted to optimize the gap configuration through the micro-motion (e.g., tilt) of the lateral bushings, which means the inclusion of balancing areas in the EGM.

It is common practice in the EGM manufacturing industries to design these balancing areas using very simplified numerical approaches or even empirical procedures based on prior experience. The balancing areas are positioned on the side of each lateral bushing plate (e.g., on lateral bushing plates 120 facing away from the gears 110, 112 in FIG. 2A) and are intended to contribute to the force balance, also known as the "axial balance," of the floating lateral bushings. In operation, the balancing areas are supposed to generate pressure forces that, in theory, balance the pressure forces and moments arising from the lateral lubricating interface and the tooth space volumes. An overbalanced condition implies that the gap film thicknesses are low and, thus, results in increased wear and viscous shear losses from the gap. On the other hand, an underbalanced condition leads to increased gap heights, which result in increased lateral leakages.

Conventional design leaves much be desired in terms of the accuracy of the balancing areas. As previously stated, these areas are not designed with any specificity, but instead based on empirical data or simple, numerical approaches that do not accurately quantify or even consider all of the relevant factors. Indeed, conventional design techniques do not comprehensively account for the elastohydrodynamic effects and the micromotion of the floating lateral bushings, which are quite significant (especially under high-pressure operating conditions). Even with the use of conventional balancing areas, obtaining an optimally balanced condition has proven elusive using conventional methods. Accordingly, there remains a need for further contributions in this area of technology to more effectively design balancing areas on the lateral bushings.

BRIEF SUMMARY

Exemplary embodiments of the present disclosure provide a gear for use in an external gear machine, the comprising a gear tooth comprising a first lateral surface in a first lateral plane and a shaped surface extending away from the lateral plane to form a depth (e.g., between 0.1 microns and 500 microns) in at least a portion of the gear tooth. In at least one embodiment, the shaped surface may be partially within the first lateral plane; however, in other embodiments, no portion of the shaped surface is within the first lateral plane.

The shaped surface may extend away from the first lateral surface at a lateral shaping angle to form a wedge. There, the depth may additionally comprise a maximum wedge depth at or near a trailing edge of the gear tooth (i.e. at the end of the sloping wedge shape). In at least one exemplary embodiment, the lateral shaping angle comprises between 0° and 90°. Still further, the gear tooth may include the shaped surface on each of its lateral surfaces.

In certain embodiments (in addition to or in lieu of the wedge embodiments described herein), the first lateral surface may comprise a step surface. The step surface may comprise a flat surface in the first lateral plane that extends a first length along the first lateral surface from a leading edge of the gear tooth to a lateral profile line. Furthermore, the shaped surface may extend, in at least one iteration, from the lateral profile line to a trailing edge of the gear tooth. In at least one embodiment, the first length of the step surface comprises 50% or more of a width of the gear tooth. Additionally or alternatively, the step surface may extend between 9 percent and about 95 percent of a width of the gear tooth.

The shaped surface may also comprise a tooth-like configuration. There, the shaped surface extends away from the lateral profile line at or about a 90° angle and further comprises a flat surface. In at least one embodiment the flat surface extends a second length and defines second lateral surface in a second lateral plane, wherein the first lateral plane is separated from the second lateral plane by the depth. The second length of the shaped surface may comprise any length, as appropriate, and in at least one embodiment is less than the first length of the step surface.

Still further, the step surface and the shaped surface of the gear tooth may form a pattern that repeats sequentially along the gear tooth. The gear may be configured for use with a working fluid having a viscosity of at or greater than 0.5 cSt including, without limitation, a working fluid having a viscosity that is equivalent to or greater than 1000 cSt.

The gears of the present disclosure may comprise one or more of the gear teeth described herein. For example, in at least one exemplary embodiment, a gear hereof comprises a plurality of gear teeth, wherein each gear tooth comprises a first lateral surface in a first lateral plane and a shaped surface extending away from the lateral plane to form a depth in at least a portion of the gear tooth. Optionally, each of the plurality of gear teeth may include the shaped surface on each of its lateral surfaces and/or each of the gear teeth may comprise a step surface. For example and without limitation, each of the shaped surfaces of each gear tooth may extend away from the first lateral surface at a lateral shaping angle to form a wedge and the depth comprises a maximum wedge depth at or near a trailing edge of each of the plurality of gear teeth. The depth of each gear tooth may decrease along the lateral shaping angle of each gear tooth (for example, where the lateral shaping angle forms a wedge configuration). In at least one embodiment of the gears hereof, one or more of the dimensions of each shaped surface may be calculated by dividing 360 by a total number of gear teeth of that gear.

External gear machines utilizing the novel gears described herein are also provided. In at least one embodiment, such external gear machines are configured for use with a working fluid having a viscosity of at or greater than 0.5 cSt. In at least one embodiment, the viscosity of the working fluid may be at or greater than 1000 cSt.

Exemplary embodiments of an external gear machine hereof comprise a first gear comprising a gear tooth, the gear tooth comprising a first lateral surface in a first lateral plane and a shaped surface extending away from the lateral plane to form a depth in at least a portion of the gear tooth. Additionally, such external gear machines may further comprise at least one lateral bushing and at least a second gear (the second gear configured similarly to the first gear such that it has one or more shaped surfaces on the teeth thereof or, alternatively, not having shaped surfaces on its gear teeth at all).

Lateral bushings of the presently disclosed external gear machines may comprise at least one inner aperture formed therethrough (configured, for example, to receive a shaft of a gear therethrough), a base surface surrounding the at least one inner aperture and extending radially to a shape distance from a center of the at least one inner aperture, and a shaped surface surrounding the base surface and extending to a perimeter of the first lateral bushing. Furthermore, the shaped surface may include at least one feature having an axial feature depth and a feature angle and both the first gear and the lateral bushing are positioned within a housing such that a lubricating gap is formed between the first gear and the first lateral bushing.

In at least one exemplary embodiment, the axial feature depth and the feature angle may form a pattern that periodically repeats circumferentially around the at least one inner aperture at the shape distance. Additionally or alternatively, the feature may comprise a floor positioned at the axial feature depth. Still further, the feature angle may comprise at or near a 90° angle, and the axial feature depth and the feature angle may form a pattern that periodically repeats circumferentially around the at least one inner aperture at the shape distance to form a tooth-like configuration.

The external gear machines hereof may comprise one or two lateral bushings as described herein. In at least one embodiment, one or both of the lateral bushings may comprise the novel lateral bushings comprising at least one feature/shaped surface; however, alternative embodiments may comprise one lateral bushing comprising a shaped surface and one lateral bushing without a shaped surface. Where two lateral bushings are used, the second lateral bushing is positioned within the housing such that a second lubricating gap is formed between the first gear and the second lateral bushing.

In at least one embodiment, the depth of each gear tooth may decrease along the lateral shaping angle of each gear tooth to a maximum depth. Where a first and second gear are positioned relative to each other within a housing of the external gear machine, they may be positioned such that a direction of decreasing wedge depth for each gear comprises the direction of intended rotation of the first and second gears within the housing.

Methods for manufacturing the gears, lateral bushings, and external gear machines of the present disclosure are also provided. In at least one embodiment, a method for manufacturing the external gear machines described herein comprises the steps of: forming a first gear for placement within a housing, the first gear comprising at least the shaped surfaces described herein and coupled with a shaft support and a motor; forming a second gear for placement within the housing; positioning the first gear and the second gear within the housing such that a direction of inclination of the shaped surfaces of the gear teeth of each of the first gear and the second gear correspond with a direction of rotation of the first gear and the second gear within the housing; and positioning a first lateral bushing within the housing to form a first lubricating gap between the first lateral bushing and a first side of the first gear and a first side of the second gear; positioning a second lateral bushing within the housing to form a second lubricating gap between the second lateral bushing and a second side of the first gear and the second gear; wherein each of the first and second lateral bushings comprise the lateral bushing of the present disclosure, one or more dimensions of the shaped surface of the first gear are calculated by dividing 360 by a total number of gear teeth of the first gear, and the at least one feature of each of the first and second lateral bushings is periodically repeated at a frequency and dimensions determined by dividing 360 by the total number of gear teeth of the first gear. The depth of each shaped surface of the first and second gears and/or the lateral bushings may be between 0.1 microns and 500 microns and, additionally or alternatively, the depth of each shaped surface may be 10 microns or less.

BRIEF DESCRIPTION OF THE DRAWINGS

The above mentioned and other features and objects of this invention, either alone or in combinations of two or more, and the manner of attaining them, will become more apparent and the invention itself will be better understood by reference to the following description of an embodiment of the invention taken in conjunction with the accompanying drawings, wherein:

FIGS. 6A-6C show detail perspective views of a gear tooth of a gear according to exemplary embodiments of the present disclosure (FIG. 6A) and the lubricating gap domain associated therewith (FIG. 6B), and illustrate a profile of the gear tooth of FIGS. 6A and 6B (FIG. 6C).

FIG. 7A shows detail perspective views of a gear tooth of a gear according to exemplary embodiments of the present disclosure.

FIG. 7B illustrates a profile of the gear tooth of FIG. 7A.

Figure 1:
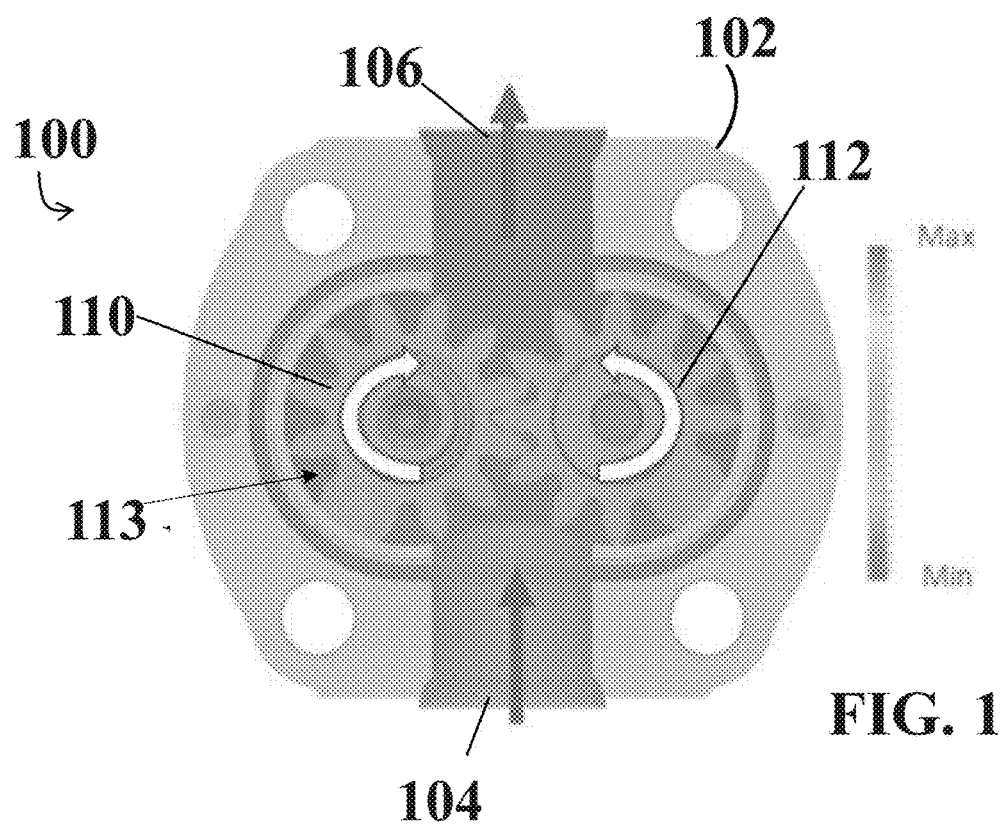
FIG. 1 shows a cross-sectional view of an external gear machine according to exemplary embodiments of the present disclosure.

Wherever feasible and convenient, like reference characters indicate corresponding parts throughout the several views, figures, and descriptions. Although the drawings represent embodiments of the present invention, the drawings may be in a simplified form, are not necessarily to scale, and/or certain features may be exaggerated in order to better illustrate and explain the full scope of the present invention. The flow charts and screen shots are also representative in nature, and actual embodiments of the invention may include further features or steps not shown in the drawings. The disclosure is presented in this manner merely for explanatory purposes and the principles and embodiments described herein may be applied to devices and/or system components that have dimensions/configurations other than as specifically described in the present disclosure. Indeed, it is expressly contemplated that the size and shapes of the device and system components of the present disclosure may be tailored in furtherance of the desired application thereof. The exemplification set out herein illustrates an embodiment of the invention, in one form, and such exemplifications are not to be construed as limiting the scope of the invention in any manner.

DETAILED DESCRIPTION

For the purposes of promoting an understanding of the principles of the present disclosure, reference will now be made to the embodiments illustrated in the drawings and specific language will be used to describe the same. It will nevertheless be understood that no limitation of the scope of this disclosure is intended, with any additional alterations, modifications, and further applications of the principles of this disclosure that would normally occur to one skilled in the art being encompassed hereby. Accordingly, this disclosure is intended to cover alternatives, modifications, and equivalents as may be included within the spirit and scope of this disclosure as defined by the appended claims. While this technology may be illustrated and described in one or more preferred embodiments, the systems, methods, and techniques hereof may comprise many different configurations, forms, materials, and accessories.

In the following description, numerous specific details are set forth in order to provide a thorough understanding of the present disclosure. Particular examples may be implemented without some or all of these specific details and it is to be understood that this disclosure is not limited to particular systems, which can, of course, vary.

Various techniques and mechanisms of the present disclosure will sometimes describe a connection or link between two components. Words such as attached, linked, coupled, connected, and similar terms with their inflectional morphemes are used interchangeably, unless the difference is noted or made otherwise clear from the context. These words and expressions do not necessarily signify direct connections, but include connections through mediate components and devices. It should be noted that a connection between two components does not necessarily mean a direct, unimpeded connection, as a variety of other components may reside between the two components of note. Consequently, a connection does not necessarily mean a direct, unimpeded connection unless otherwise noted.

Unless defined otherwise, all technical and scientific terms used herein have the same meaning as commonly understood by one of skill in the relevant arts. Although any methods and materials similar to or equivalent to those described herein can be used in the practice or testing of the subject of the present application, the preferred methods and materials are described herein. Additionally, as used in this specification and the appended claims, the singular forms "a", "an" and "the" include plural referents unless the content clearly dictates otherwise.

As is known in the art, function of an external gear machine requires working fluid to flow therethrough. While various specific working fluids are referred to in the present disclosure, it will be appreciated that no limitation is intended thereby and it will be understood that the devices, systems, and techniques hereof may be utilized in connection with a large range of working fluids—for example, those with low viscosities (0.5 cSt), high viscosities (1000 or more cSt), or anywhere in between.

The present disclosure includes an external gear machine, and systems and methods of using and making the same, where the external gear machine includes gear teeth having shaped lateral surfaces. In such an external gear machine, the lateral surfaces of a plurality of the gear teeth have a microsurface shaped surface or profile. The addition of this microsurface shaping improves the hydromechanical efficiency of the external gear machine by improving its lubricating ability and ultimately results in lower power losses associated with the lubricating gap (given by leakage and fluid shear) and reduced wear to component parts (i.e. the gears and bushings) during operation. Additionally, use of the microsurface shaping designs of the present disclosure also improve the limits conventionally associated with external gear machines in terms of operating conditions range.

In at least one embodiment, the shaped surface/profile may comprise a single sloped or flat linear wedge, or a series thereof, added to the lateral surfaces of the gear teeth. Additional exemplary embodiments of the present disclosure include a lateral gear tooth surface having a step plus a linear wedge, a step plus a depressed flat surface, or a series of either of such profiles as described further herein. Additional embodiments hereof provide novel numerical optimization tools for determining the optimal balancing areas in the lateral bushings used in conjunction with the various microsurface shape modifications of the gear teeth of the present disclosure. Using these advanced numerical tools, the delicate design process is simplified.

A cross-sectional view of an external gear machine 100 is shown in FIG. 1. As shown in FIG. 1, an external gear machine 100 includes a drive gear 110 meshed with a slave gear 112 operably mounted within a housing 102. The gears 110, 112 are positioned in close tolerance within a cavity defined by the housing 102, yet due to the configuration of each gear's teeth, a tooth space volume 113 is defined within the pockets between the gear teeth.

The housing 102 further defines a suction port 104 on the low pressure side of the external gear machine 100 and a delivery port 106 on the high pressure side of the external gear machine 100. The external gear machine 100 may be any machine having external gears including, but not limited to, pumps and compressors. The drive gear 110 may be attached to a gear shaft that is driven by a motor (not shown). As the drive gear 110 rotates, the drive gear 110 in turn drives the slave gear 112, which rotates on a separate gear shaft.

When the gear(s) 110, 112 are driven and rotate against each other, the meshing action between the two gears 110, 112 displaces any fluid present within the cavity of the housing 102. Accordingly, the rotation of the gears 110, 112 within the housing 102 creates a pressure differential between the suction and delivery ports 104, 106, with the suction port 104 having a lower pressure than the delivery port 106.

Figure 2A:
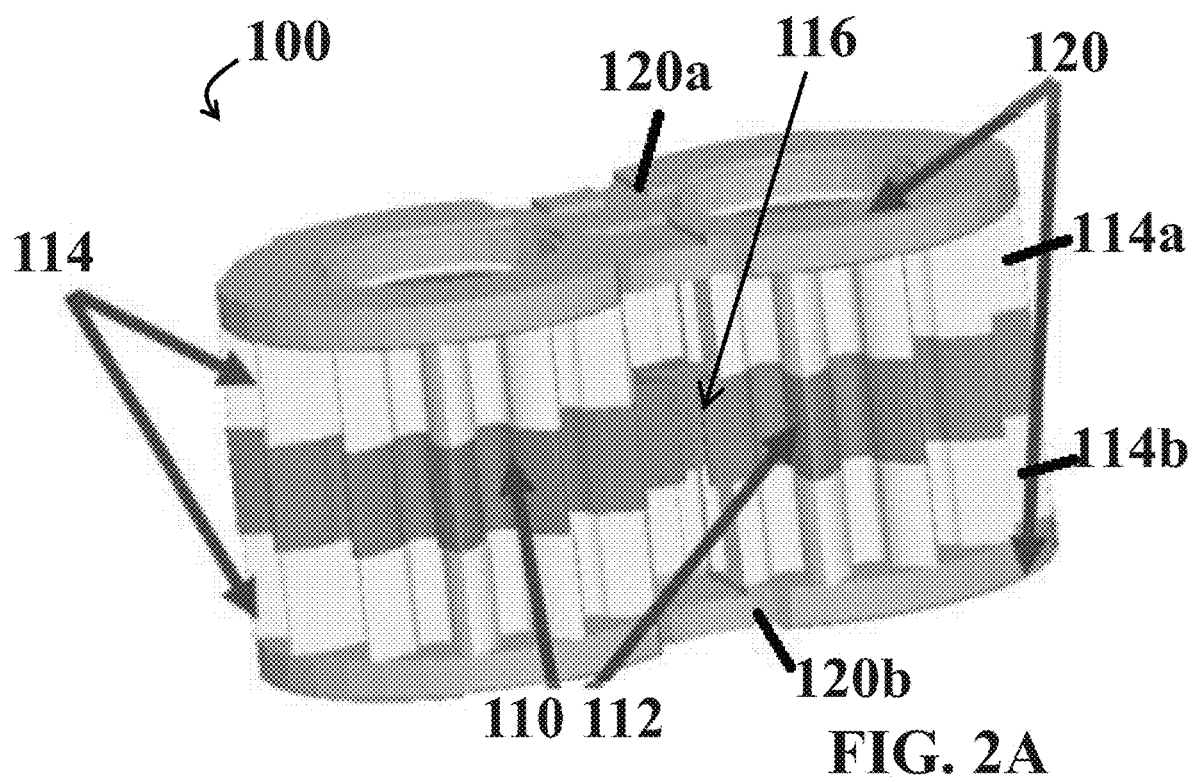
FIG. 2A shows a perspective view of a portion of an external gear machine according to exemplary embodiments of the present disclosure and FIG. 2B illustrates the system of forces acting on a lateral bushing that comprise axial balance condition in EGMs.

The external gear machine 100 may further include lateral bushings 120 (for example, a first lateral bushing 120a and a second lateral bushing 120b), each lateral bushing 120 disposed adjacent to the lateral sides of the drive gear 110 and the slave gear 112 as shown in FIG. 2A. The lateral bushings 120 seal the lateral sides of the drive gear 110 and slave gear 112 to prevent leaks from the tooth space volumes 113, while also providing a lubricating interface or gap 114 between each of the lateral bushings 120 and the drive gear 110 and slave gear 112 to bear high pressure loads and prevent frictional loss between such components (for example, a first and second lubricating gap 114a and 114b). The drive gear 110 and slave gear 112 may further include a top land interface 116 with which the drive gear 110 and slave gear 112 mesh most closely.

Figure 2B:
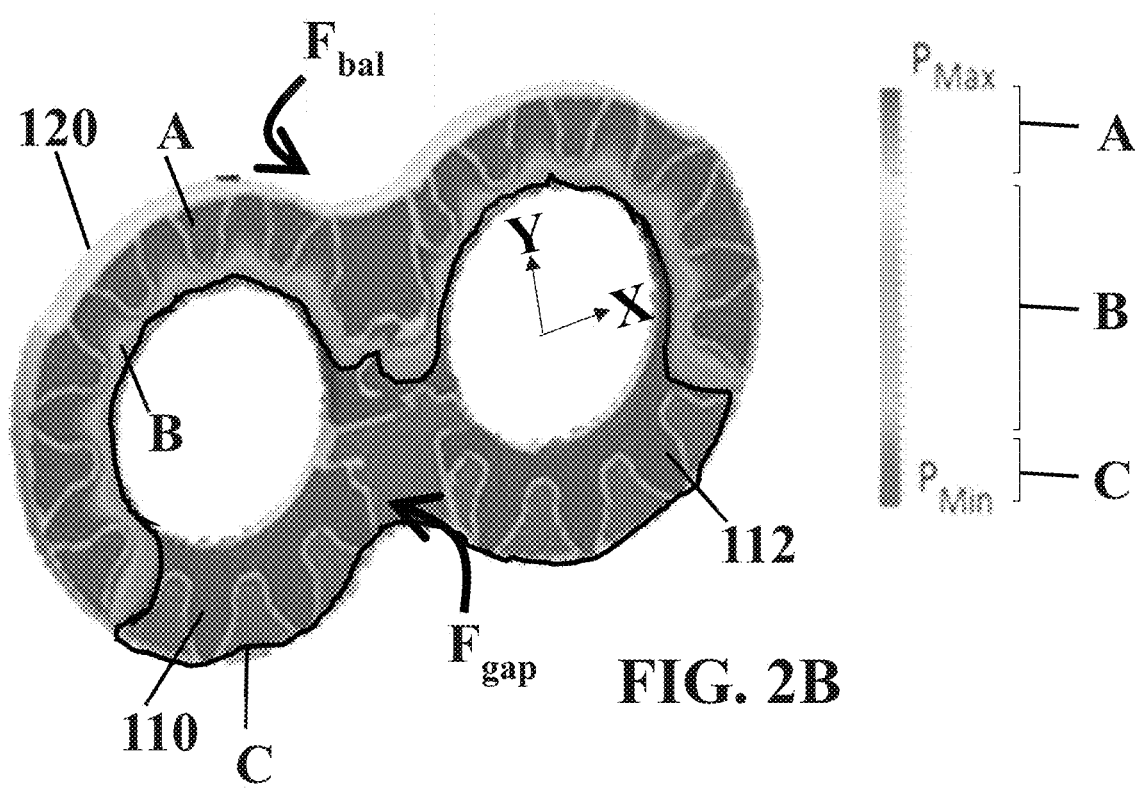

In operation, the axial force balance on each lateral bushing 120 includes two opposing forces ($F_{bal}$ and $F_{gap}$) that act on the bushing 120 as shown in FIG. 2B. Force $F_{gap}$ arises due to the pressures in the lubricating gap 114 and the tooth space volumes 113 of the gears 110, 112 and acts on the balancing areas located on the side of the bushing 120 facing the gears 110, 112. Force $F_{bal}$ acts on the balancing areas located on the opposite side of the lateral bushing 120 and is directed toward the gears 110, 112. The resulting system of forces comprises the axial balance condition in the external gear machine 100 and, thus, optimal balance should consider both of forces $F_{bal}$ and $F_{gap}$. As shown in FIG. 2B, during operation, the strongest axial force/highest pressure occurs in area A, which is also identified by dark shading. The weakest axial force/lowest pressure occurs in area C, which is outlined in black, and medium axial force/pressure occurs in area B, which is outside of the outlined area and identified by lighter shading.

Notably, an overbalanced condition refers to the film thickness of the lubricating gap 114 being low (i.e. a smaller lubricating gap 114), which results in increased wear to the gears 110, 112 and bushings 120 and viscous shear losses from the lubricating gap 114. An underbalanced condition leads to increased lubricating gap 114 heights, which results in an increase in lateral leakages. Accordingly, an optimum axial balance takes into account both of these factors.

Figure 3:
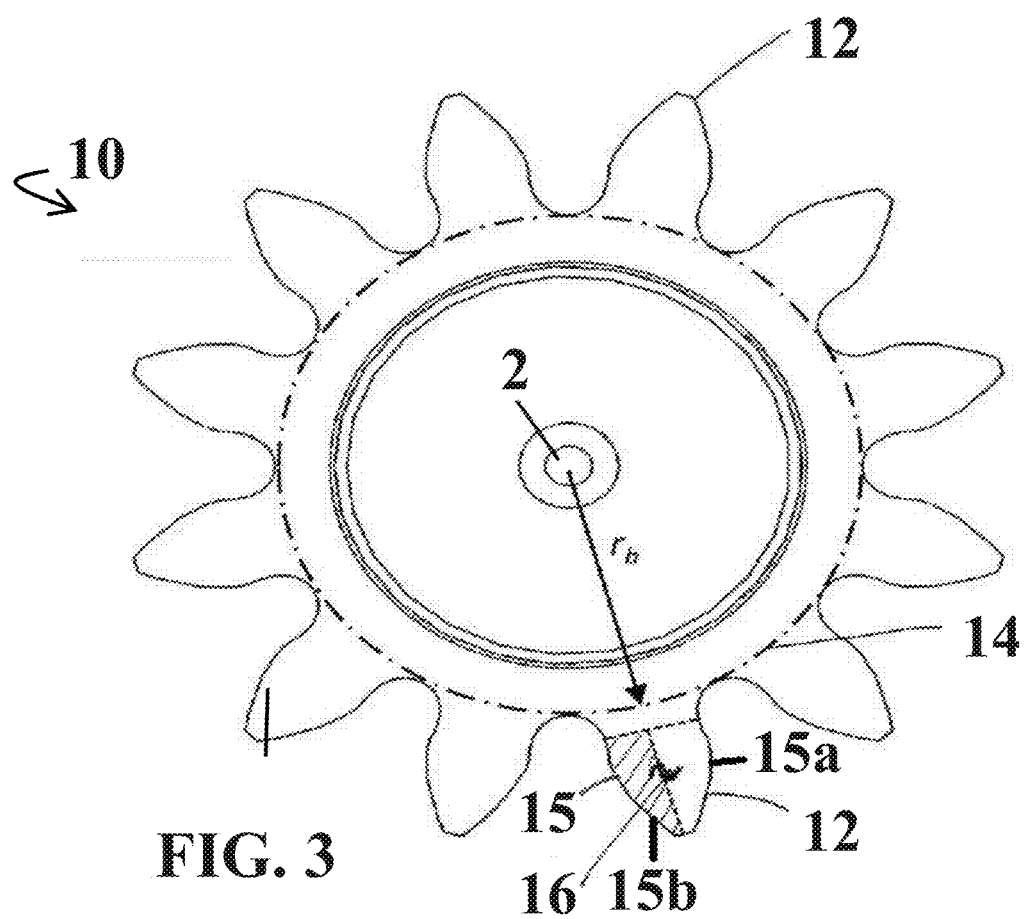
FIG. 3 shows a gear according to exemplary embodiments of the present disclosure.

An exemplary embodiment of the present disclosure is shown in FIG. 3. As shown in FIG. 3, a gear 10 may include a plurality of gear teeth, including as least one gear tooth 12. The gear 10 may be a drive gear such as the drive gear 110 or a slave gear such as the slave gear 112 and may be employed in the external gear machine 100. Each gear tooth 12 is defined in part by a base circle 14, which is circumferentially defined at a base circle radius $r_b$ from a centroid 2 of the gear 10. Each gear tooth 12 is further defined by a peripheral tooth profile 15 comprising a first edge 15a/leading edge and a second edge 15b/trailing edge. While only one gear tooth 12 is shown in FIG. 3 as comprising microsurface shaping, it will be appreciated that this is not intended to be limiting and any number of the gear teeth 12 on gear 10 may have one or more of the microsurface shaping profiles described herein.

Figure 4A:
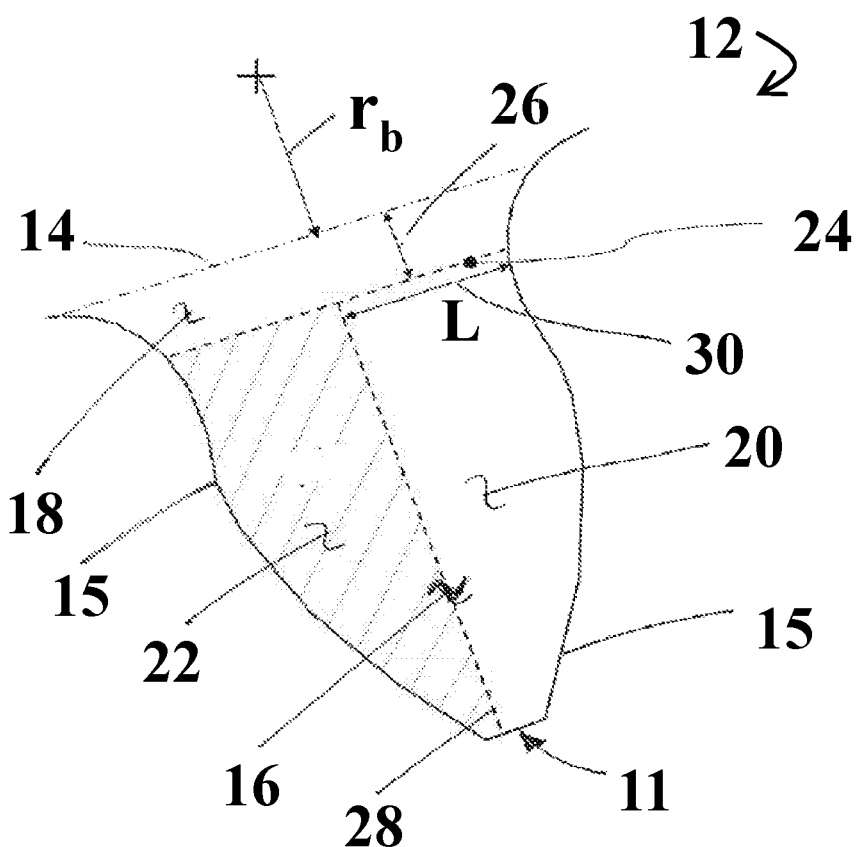
FIGS. 4A and 4B show detail views of a gear tooth of a gear according to exemplary embodiments of the present disclosure.
Figure 4B:
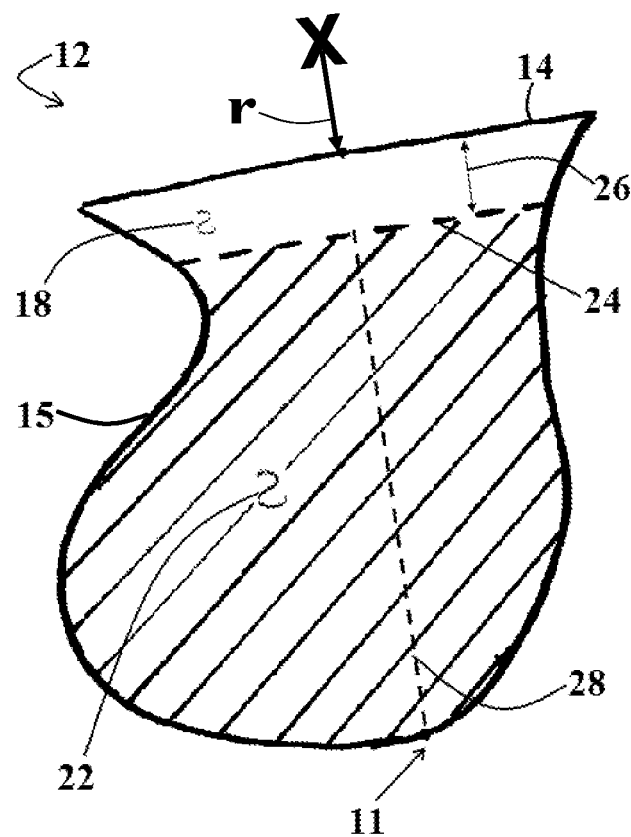
Figure 5A:
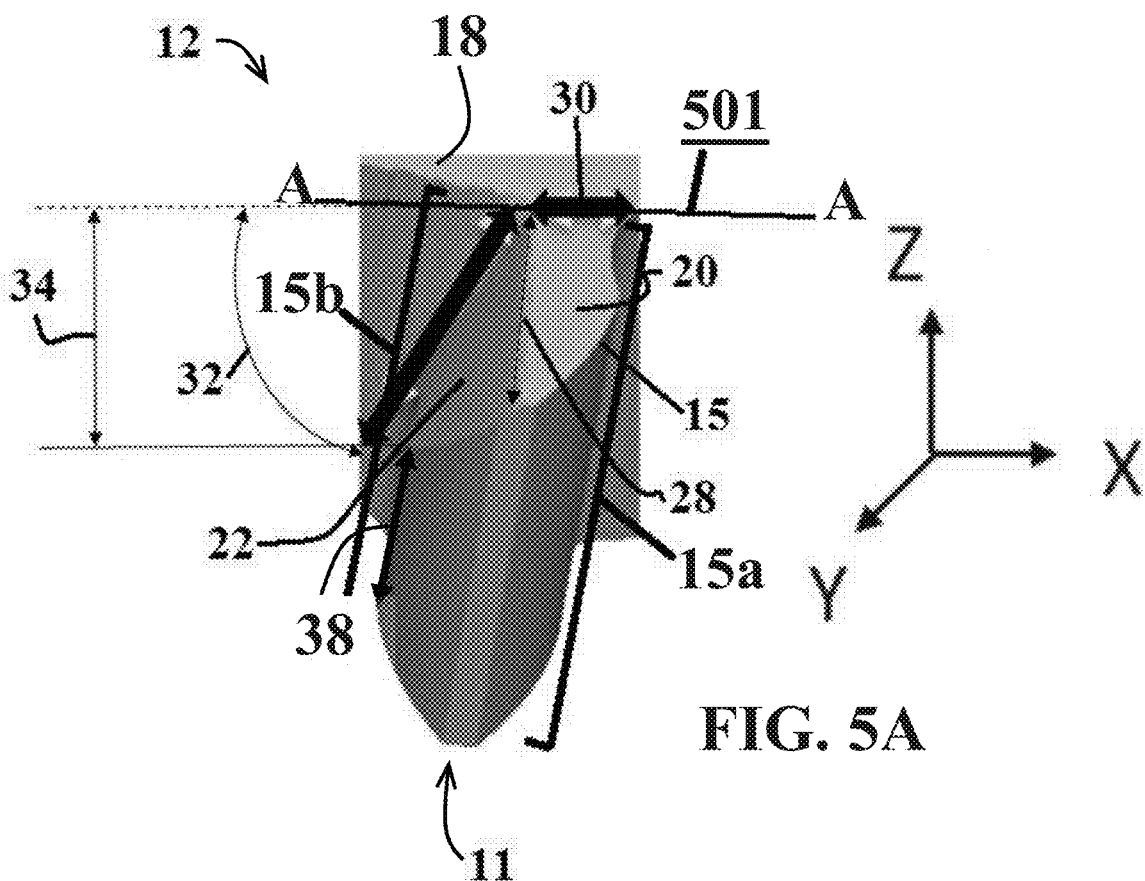
FIG. 5A shows detail perspective view of a gear tooth of a gear according to exemplary embodiments of the present disclosure and FIG. 5B show the lubricating gap domain comprising the step and wedge surface shaping of FIG. 5A.

As shown in FIGS. 4A and 4B, the lateral surface 16 of the gear tooth 12 may include a root surface 18, a step surface 20, and/or a shaped surface 22. The root surface 18 is that portion of the lateral surface 16 extending between the base circle and a bounding profile line 24 and defines a first lateral plane 501 taken along Line A-A as shown in FIG. 5A. The bounding profile line 24 is separated from the base circle 14 by a radial bounding distance 26. The bounding profile line 24 may have any desired shape including, for example, linear (as shown in FIG. 4A), curvilinear, splined, etc. The bounding distance 26 may be any desired dimension from zero, where the bounding profile line 24 falls along the base circle 14, to the length of gear tooth 12 at the distal end 11. Additionally, in at least one exemplary embodiment, the bounding distance 26 may vary along the length of the bounding profile line 24 (not shown). In any case, the bounding profile line 24 defines a boundary between the developed portion of the lateral surface 16 and the remainder of the gear tooth 12.

The step surface 20 is that portion of the lateral surface 16 extending between the bounding profile line 24 and the tooth profile 15 and extending to a distal end 11 of the gear tooth 12. The step surface 20 is further defined by a lateral profile line 28, which comprises a lateral length 30 along the lateral surface 16 from the tooth profile 15 (i.e. edge), as shown in FIG. 4A. In at least one embodiment, the step surface 20 comprises a flat surface without any additional machining on the lateral side of the gear tooth (see FIG. 5A).

In an exemplary embodiment, the step surface 20 begins laterally at the leading edge (first edge 15a) of the tooth profile 15 in the direction of rotation of the gear 10. The step surface 20 may extend a first length (otherwise identified as the lateral length 30) from the leading edge of the tooth profile 15 to the lateral profile line 28. In certain embodiments, the step surface 20 and the root surface 18 may be in the same plane (i.e., the lateral plane such that the first lateral plane 501 and the second lateral plane are the same); however, this need not necessarily be the case. The first length (see lateral length 30 in FIGS. 4A and 5A) may be any desired dimension from 0% to 100% of the overall width of the lateral surface 16. In certain embodiments, the lateral length 30 may be between about 0% and 95% of the overall width of the lateral surface 16.

In at least one additional exemplary embodiment of the gear tooth 12 shown in FIG. 4B, the lateral length 30 is zero and, thus, the gear tooth 12 includes no step surface 20. In such an embodiment, the lateral profile line 28 is the leading edge of the tooth profile 15, and the shaped surface 22 comprises all of the lateral surface 16 excluding the root surface 18.

The shaped surface 22, shaded for clarity in FIGS. 4A and 4B, is adjacent the root surface 18 and the step surface 20 (where applicable) and may include any developed shape. The shaped surface 22 is that portion of the lateral surface 16 extending between the bounding profile line 24 and the tooth profile 15 and extending to a distal end 11 of the gear tooth 12. In the embodiment of FIG. 4A, the shaped surface 22 is adjacent the step surface 20, which may be delineated by the lateral profile line 28. In the exemplary embodiment shown in FIG. 4A, the shaped surface 22 is defined laterally between the lateral profile line 28 and the trailing edge of the tooth profile 15 in the direction of rotation of the gear 10. Alternatively, where the lateral surface 16 does not comprise a step surface 20 as shown in FIG. 4B (i.e. the lateral length 30 is zero), the shaped surface 22 is defined between the tooth profile 15 and the bounding profile line 24. There, the shaped surface 22 may comprise a linear sloping wedge introduced at or near each leading tooth profile 15, for example.

Figure 5B:
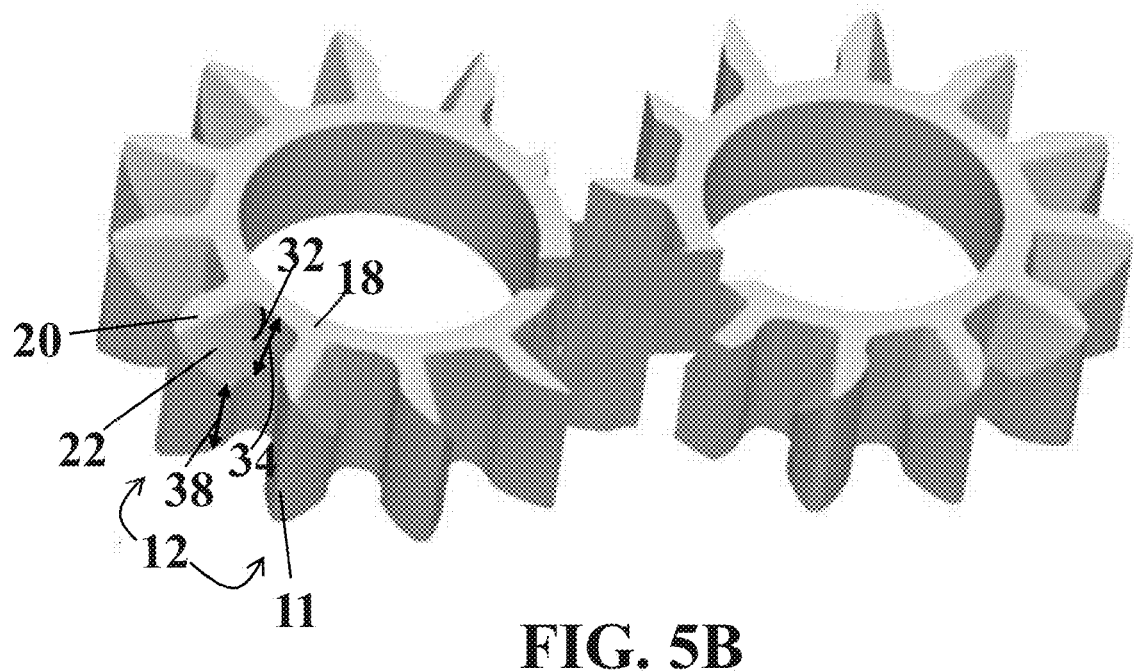
Figure 5C:
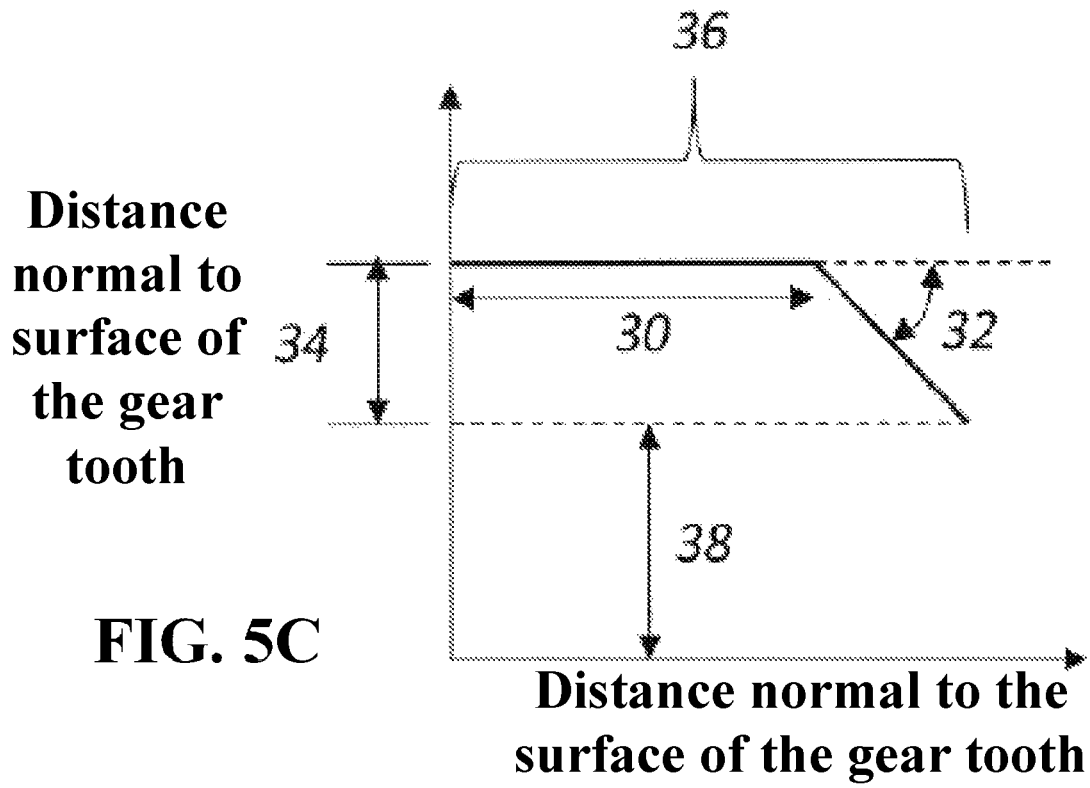
FIG. 5C illustrates a profile of a gear tooth of a gear according to exemplary embodiments of the present disclosure.

In at least one embodiment per the present disclosure as shown in FIGS. 5A-5C, the shaped surface 22 is a linear surface (or sloping wedge) extending at a lateral shaping angle 32 from the plane of the root surface 18. From the lateral profile line 28, the shaped surface 22 may extend linearly to the trailing edge of the tooth profile 15 at the lateral shaping angle 32 to form a wedge depth 34, which is the depth of the shaped surface 22 below the lateral plane, which is the plane of the root surface 18 and step surface 20, at the trailing edge in a direction normal to the root surface 18. In such an embodiment, the lateral shaping angle 32 may be any desired angle between 0 and 90 degrees)(°). In an embodiment in which the lateral shaping angle 32 is 0°, the entire shaped surface 22 is on the same lateral plane as the root surface 18 and step surface 20. In alternative embodiments, the shaped surface 22 may have multiple lateral shaping angles 32 separated by multiple lateral profile lines 28. In further alternative embodiments, the shaped surface 22 may be a polynomial surface having no or some inflection points between the lateral profile line 28 and the trailing edge of the tooth profile 15. In such an embodiment, the shaped surface 22 may not have a specific lateral shaping angle 32.

FIG. 5C illustrates exemplary parameters of the lateral surface 16 and the gear tooth 12 that define a tooth pattern 36. In certain embodiments, the tooth pattern 36 may be repeated uniformly on each gear tooth 12 of the gear 10. For a given gear 10, the tooth pattern 36 may be periodically repeated according to the formula 360 divided by the total number of gear teeth 12. As depicted in FIG. 5C, in at least one embodiment of the present disclosure, the tooth pattern 36 may be defined by a minimum tooth height 38, the lateral length 30 and the lateral shaping angle 32. The tooth pattern 36 further defines a width of a single gear tooth 12. As is apparent from FIG. 5C, the wedge depth 34 is generally dependent upon the overall dimensions of the gear 12 and the gear tooth 10. Specifically, the wedge depth 34 is driven by the lateral shaping angle 32, the first length of the step surface 20 (i.e. lateral length 30), and the overall width of the gear tooth 12. An overall eight of the tooth 12 (i.e. the dimension between the lateral sides of the tooth) is comprised of the wedge depth 34 and the minimum tooth height 38, which is the height of the gear tooth 12 at its trailing edge from the opposing lateral side.

Figures 6A, 6B:
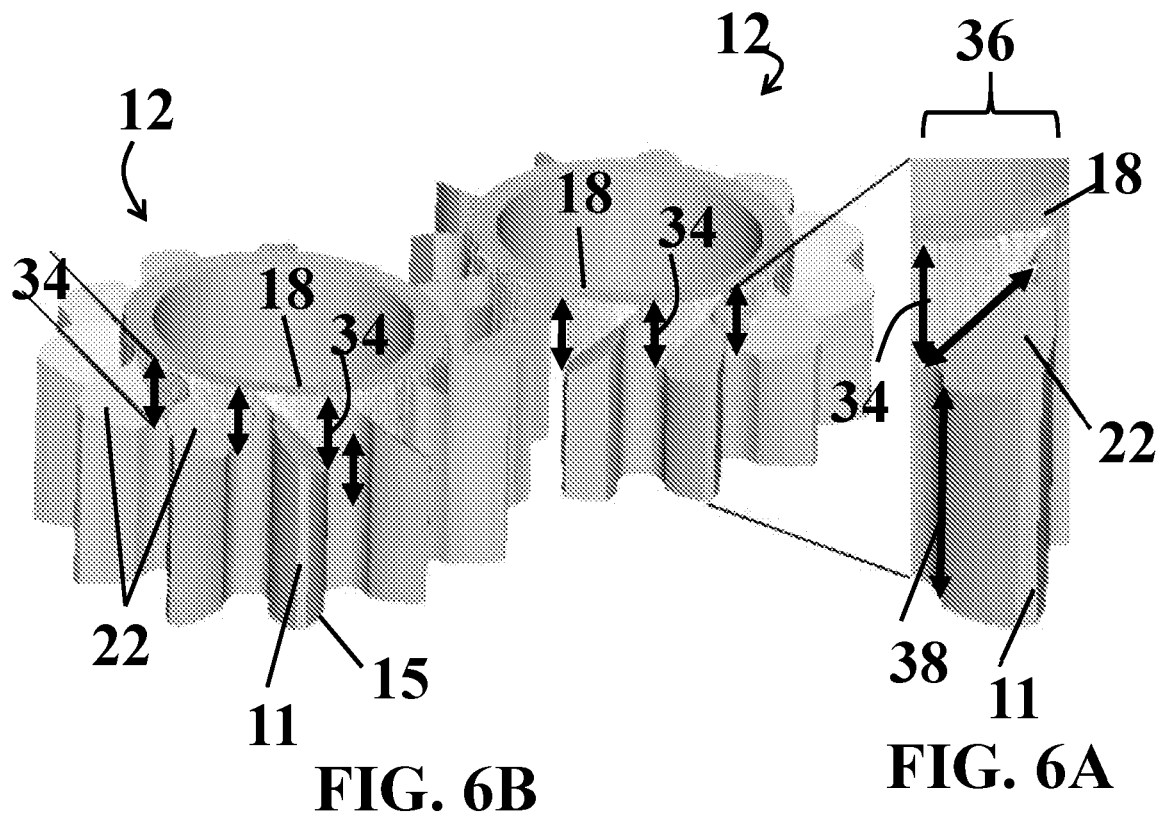

Now referring to FIGS. 6A-6C, at least one embodiment of a gear tooth 12 is shown where the lateral length 30 of the step surface 20 is zero and, as such, the lateral surface 16 consists of the shaped surface 22 that forms a sloping wedge between the leading and trailing edges of the peripheral tooth profile 15. Here, the shaped surface 22 extends linearly at the lateral shaping angle 32 to form a first depth (otherwise identified as wedge depth 34) at the trailing edge. Only the foremost edge of the shaped surface 22 is on the same plane as the root surface 18, if at all. Indeed, because the linear wedge (shaped surface 22) is introduced from the beginning of each tooth 12 on the lateral surface 16 of the gear 10, different designs of the wedged gear can be generated by merely modifying the maximum first depth of the shaped surface 20 (i.e. wedge depth 34) Notably, the direction of decreasing wedge depth 34 should be in the same direction as that of the intended rotation of the gears 10 to ensure that the additional hydrodynamic force aids in generation of lubricating films of greater thickness.

Perhaps more specifically, in the embodiments of FIGS. 6B and 6C, the shaped surface 22 is entirely below the lateral plane; accordingly, an initial depth 35 is defined between the plane of the root surface 18 (i.e. the lateral plane of the gear 12) and where the shaped surface 22 initiates. Because the area between the leading and trailing edges of the peripheral tooth profile 15 is constant, if an initial depth 35 is used, an adjustment to the lateral shaping angle 32 may be required for the wedge to span the entire tooth 12.

As with other embodiments, the lateral shaping angle 32 may be any desired angle between 0 and 90 degrees)(°). However, in an embodiment in which the lateral shaping angle 32 is 0° and the tooth pattern 36 defines an initial depth 35, the shaped surface 22 is not on the same lateral plane as the root surface 18, but instead extends parallel therewith at the recessed initial depth 35. Alternatively, the shaped surface 22 may have multiple lateral shaping angles 32 separated by multiple lateral profile lines 28 and/or comprise a polynomial surface having no or some inflection points between the lateral profile line 28 and the trailing edge of the tooth profile 15 (not shown).

FIGS. 7A and 7B show yet another embodiment of a microsurface shaped gear tooth 12. As with previously described embodiments, the lateral surface 16 of the tooth 12 comprises a step surface 20, a shaped surface 22, and a root surface 18, with the step surface 20 adjacent to and on-plane with the root surface 18. The shaped surface 22, however, comprises a flat surface positioned a depth $d_s$ into the depth of the gear tooth 12. In at least one exemplary embodiment, the lateral shaping angle 32 additionally comprises 90° such that the shaped surface 22 extends downward for depth $d_s$, at which point another at or near 90° angle is formed and the shaped surface 22 extends parallel with the lateral plane of the step surface 22 to form a teeth-like configuration. The depth $d_s$ may comprise between 0-500 µm, as desired, noting that where the depth $d_s$ comprises 0 µm the shaped surface 22 remains on-plane with the step surface 20 (assuming any lateral shaping angle 32 is 0°).

A lateral surface of a tooth 12 may comprise two or more pairs of step and shaped surfaces 20, 22 and/or a periodic repetition of the shaped surfaces 22. For example, each step and shaped surface 20, 22 of a pair may be separated by depth $d_s$, with each step surface 20 positioned on-plane with the root surface 18/lateral plane (forming, for example, a teeth-like profile, with all shaped surfaces 22 differing from the step surfaces 20 by depth $d_s$). Alternatively, only the configuration of the microsurfaced shaped surface 22 may be periodically repeated (forming, for example, a stair-step progression).

Figure 8:
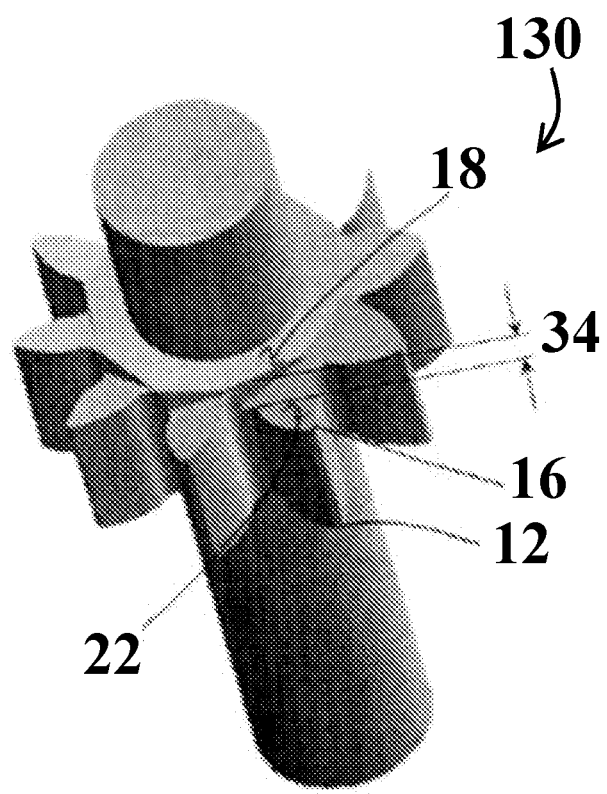
FIG. 8 shows a perspective view of an exemplary gear according to exemplary embodiments of the present disclosure.
Figure 9:
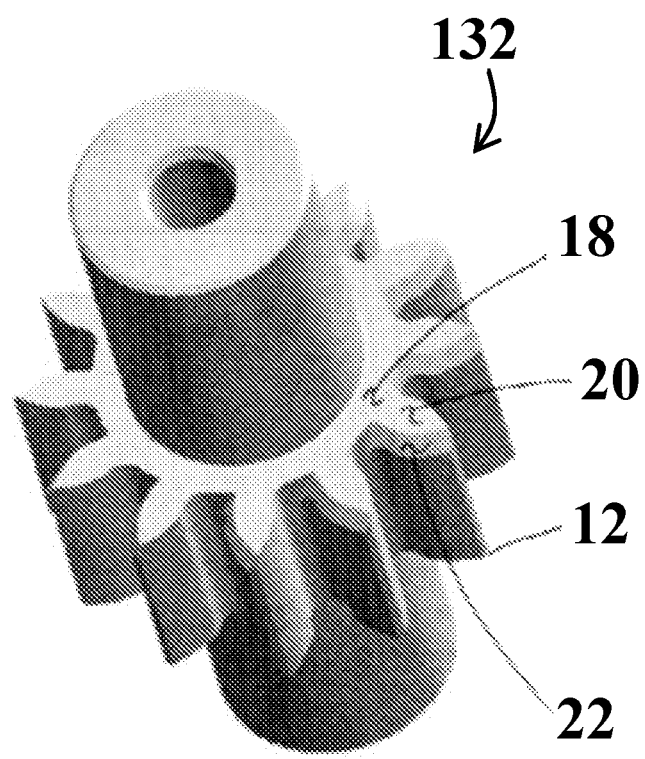
FIG. 9 shows a perspective view of an exemplary gear according to exemplary embodiments of the present disclosure.

FIG. 8 shows a linear sloping wedge gear 130 in which the lateral length 30 is zero and, thus, the lateral surface 16 each gear tooth 12 includes the root surface 18 and the shaped surface 22, but does not include the step surface 20 (similar to the embodiments shown in FIGS. 6A-6C, except that here the shaped surface 22 is not offset from the lateral surface 16 by an initial depth 35). In at least one exemplary embodiment, the linear sloping wedge gear 130 comprises a wedge depth 34 of 1 µm. FIG. 9 shows a step-plus-wedge gear 132 in which the lateral length 30 is greater than zero and, thus, the lateral surface 16 of each gear tooth 12 includes the root surface 18, shaped surface 22, and step surface 20. In at least one exemplary embodiment, the step-plus-wedge gear 132 comprises a 50% step (i.e. about 50% of the overall width of the tooth 12) and a 10 µm maximum wedge depth. Alternatively, one or more of the teeth 12 may comprise a step-plus-wedge configuration comprising a 50% step and a 1 µm, 3 µm, or 5 µm maximum wedge depth.

The first depth of the shaped surface 22 (i.e. wedge depth 34) may be any desired dimension for a given application of external gear machine 100. However, the first depth/wedge depth 34 is at least partially limited by the overall dimensions of the gear tooth 12, noting too that if an initial depth 35 is also employed, the lateral shaping angle 32 may need to be adjusted to achieve a desired overall wedge depth 34. In certain embodiments, the first depth of the shaped surface (i.e. wedge depth 34) is between about 0.1 micron (µm) and 500 µm. Furthermore, in many of the embodiments described herein, the wedge depth 34 is not consistent across the tooth 12, but instead may vary either in a linear fashion (e.g., such as where the shaped surface 22 comprises a wedge defining a single lateral shaping angle 32) or otherwise (e.g., where the shaped surface 22 comprises a teeth-like or stair-step configuration). In at least one embodiment, the wedge depth 34 may range from approximately 1 µm to about 10 µm and, perhaps more specifically, 1 µm, 3 µm, 5 µm or 10 µm. In at least one embodiment, the lateral length 30 may range from 0% to 95% of the overall width of the lateral surface 16, including approximately 50% thereof in certain embodiments. Additional factors affecting the selection of the wedge depth 34 include, but are not limited to, the operating pressure and speed of the external gear machine 100, an axial balance condition, and the lateral gap condition between the bushing 40 and the gear 10.

Figure 10:
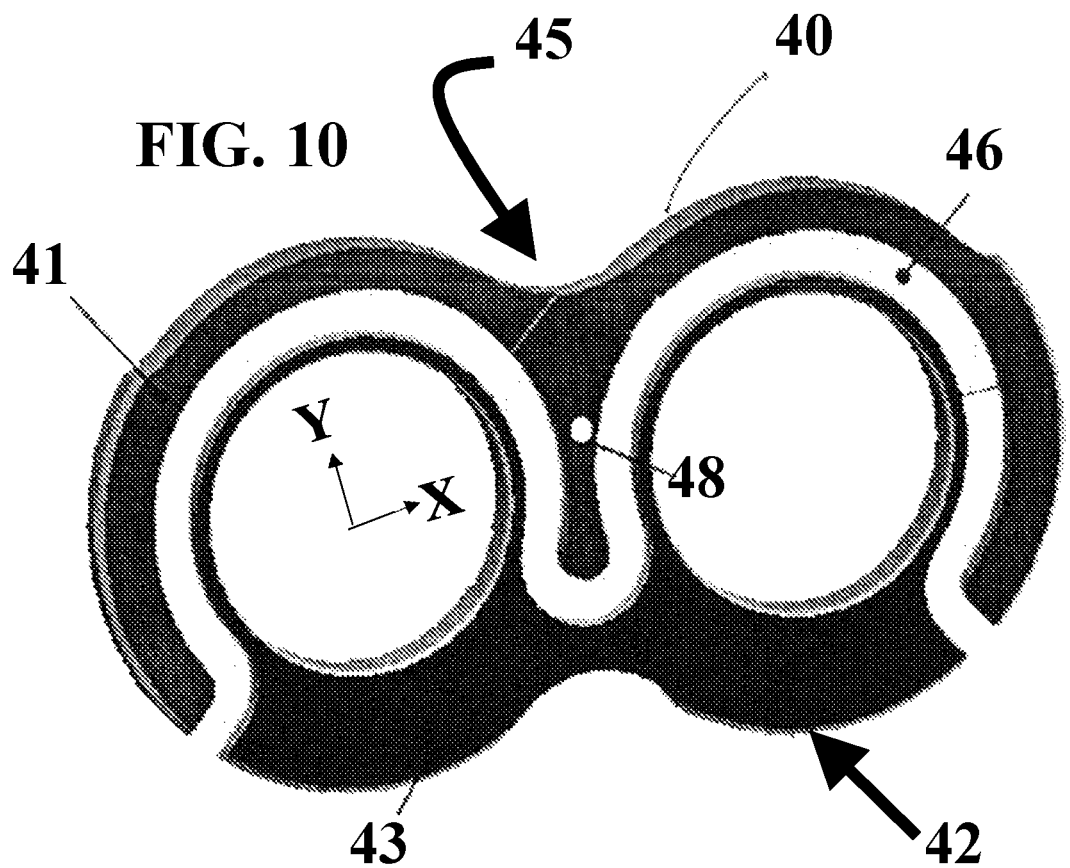
FIG. 10 shows a perspective view of a lateral bushing of an external gear machine according to exemplary embodiments of the present disclosure.

In at least one embodiment according to the present disclosure, the external gear machine 100 may include one or more shaped lateral bushings 40 as shown in FIG. 10. FIG. 10 depicts a back side 42 of the lateral bushing 40 that faces away from the gears 10, as where the lateral bushing 40 is employed in the external gear machine 100 shown in FIG. 2A. The lateral bushing 40 may include a high pressure (balance) area 41 and a low pressure (balance) area 43. A seal 46 may separate the high pressure area 41 from the low pressure area 43. The high pressure area 41 and the low pressure area 43 generate a balance point 48 about which a force balance exists, also known as the "axial balance," that may affect the lubrication performance of the lateral bushings 40 employed in pressure compensated external gear machines 100, for example. As previously noted herein and described in further detail in the published article "Improvement of Lubrication Performance in External Gear Machines Through Micro-surface Wedged Gears" (Thiagaraj an et al. (2016): Improvement of Lubrication Performance in External Gear Machines through Micro-surface Wedged Gears, Tribology Transactions, DOI: 10.1080/10402004.2016.1168898) (the "Incorporated Publication") which is incorporated herein by reference in its entirety, axial balance is a significant factor affecting external gear machine performance since an over-balanced condition implies that the gap film thicknesses are lower and thus, results in increased wear and viscous shear losses from the gap. On the other hand, an underbalanced condition leads to increased gap heights which results in increased lateral leakages. Thus, an optimum balance may be approached by configuring the lateral bushing 40 by taking into account both the high pressure and low pressure areas 41, 43 as design parameters.

Figure 11:
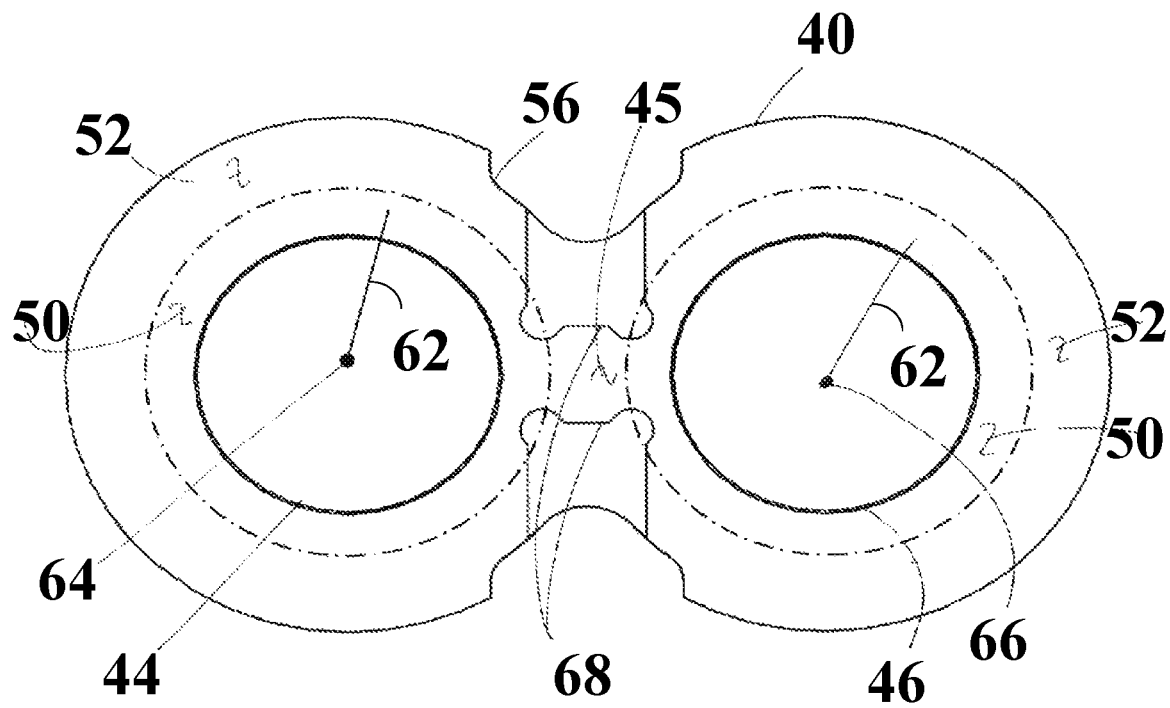
FIG. 11 shows a plan view of a lateral bushing of an external gear machine according to exemplary embodiments of the present disclosure.

FIG. 11 shows a gear side 45 of the lateral bushing 40 facing toward the gears 10, as where the lateral bushing 40 is employed in the external gear machine 100 shown in FIG. 2A. As shown in FIG. 10, the lateral bushing 40 may include a first aperture 44 and a second aperture 46 formed therethrough, each configured to receive the gear shaft of a gear 10. The first aperture 44 and second aperture 46 may be configured with inner diameters that accommodate corresponding gear shafts with marginal clearance. In certain embodiments, the gear side 45 of the lateral bushing 40 may be planar. In alternative embodiments, the gear side 45 includes a shaped surface around at least a portion of the first aperture 44 and second aperture 46. The gear side 45 may include one or more relief grooves 68.

The gear side 45 may further include a bushing base surface 50 immediately adjacent the first aperture 44 and second aperture 46. The bushing base surface 50 may comprises two separate bushing base surfaces 50 concentric to the first aperture 44 and second aperture 46, respectively, as shown in FIG. 11. Alternatively, a single bushing base surface 50 may extend around both the first aperture 44 and second aperture 46 in a lobed configuration. The gear side 45 may further include a bushing shaped surface 52 immediately adjacent the bushing base surface 50.

In at least one embodiment, the bushing shaped surface 52 may extend from a radial bushing shape distance 62 to a bushing perimeter 56, which defines the edge of the lateral bushing 40. The bushing shape distance 62 may extend radially from a first aperture center 64 of the first aperture 44. The bushing shape distance 62 may also extend radially from a second aperture center 66 of the second aperture 46. In at least one embodiment, the bushing shape distance 62 may be the same dimension for the first aperture 44 and the second aperture 46. Alternatively, the bushing shape distance 62 may be different for each of the first aperture 44 and the second aperture 46. The bushing shaped surface 52 may extend around both the bushing base surface 50 of first aperture 44 and second aperture 46 in a lobed configuration.

Figure 12:
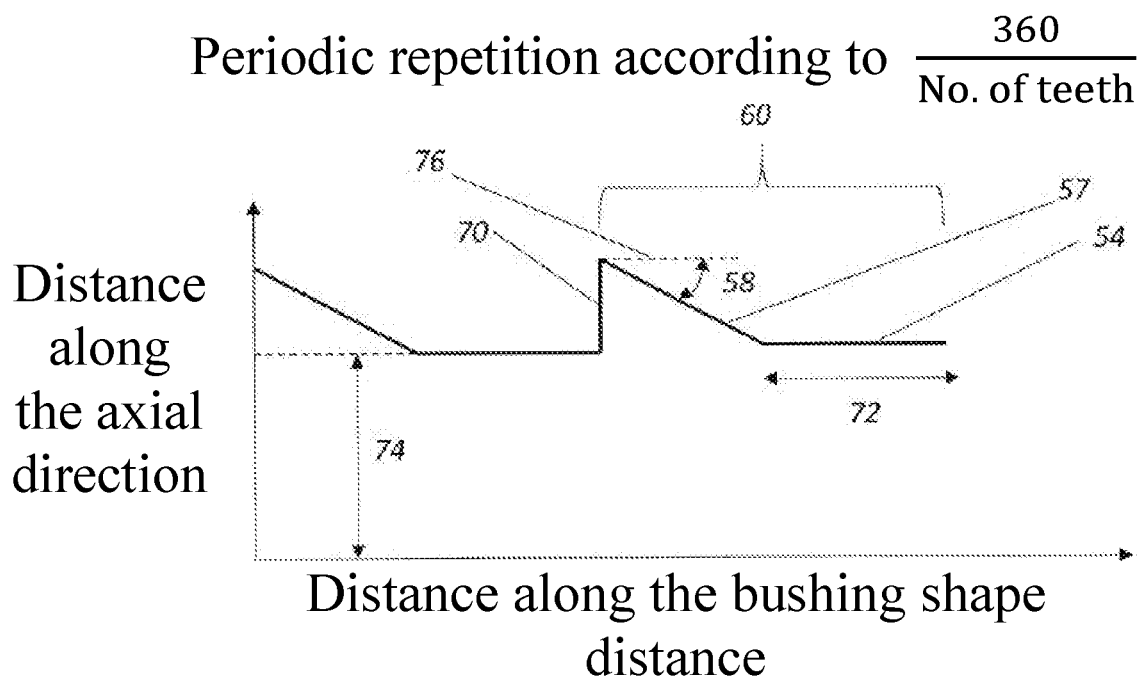
FIG. 12 illustrates a profile of a lateral bushing of an external gear machine according to exemplary embodiments of the present disclosure.

The bushing shaped surface 52 may include a repeating bushing feature 60 formed axially therein in a direction toward the back side 42. In at least one embodiment, a plurality of bushing features 60 may be formed in the bushing shaped surface 52 in a circumferentially repeating pattern beginning at the bushing shape distance 62. An exemplary bushing feature 60 is illustrated in FIG. 12. As shown in FIG. 12, the bushing feature 60 may include a wedge and floor configuration formed circumferentially along the bushing shape distance 62. In such an embodiment, the bushing feature 60 may include a feature floor 54 formed at a feature depth 70 to a minimum bushing thickness 74. The bushing feature 60 may further include an angled wall 57 extending from a plane 76 of the bushing base surface 50 at a feature angle 58 to the feature floor 54. The feature floor 54 defines a feature floor length 72, which extends circumferentially along the bushing shape distance 62 until the bushing feature 60 repeats at a succeeding feature depth 70 and angled wall 57. The bushing feature 60 may extend radially across the bushing shaped surface 52 from the bushing shape distance 62 to the bushing perimeter 56. In alternative embodiments, the bushing feature 60 may extend radially toward, but not completely to, the bushing perimeter 56.

The bushing angle 58 may be any desired angle between about 0° and 90°. Where the bushing angle 58 approaches 0°, the bushing feature 60 may include only a slight a depression in the bushing shaped surface 52. The feature floor length 72 is at least partially dependent on the bushing angle 58 and may vary accordingly. Where the feature floor length 72 is zero, the bushing feature 60 has no feature floor 54, and the bushing angle 58 is such that the angled wall 57 comprises the entire bushing feature 60, which repeats with the succeeding feature depth 70. Where the feature floor length 72 is between 0% and 100% of the overall circumferential length of the bushing feature 60, the bushing feature 60 defines a step-plus-wedge configuration as shown in FIG. 12. The bushing angle 58 and the feature depth 70 may be any desired dimensions for a given application of external gear machine 100 in which the lateral bushing 40 is employed. However, the feature depth 70 is at least partially limited by the thickness of the lateral bushing 40. In certain embodiments, the feature depth 70 may be between about 0.1 µm and 500 µm. In at least one embodiment according to the present disclosure, the feature depth 70 may range from approximately 1 µm to about 10 µm and, specifically, 1 µm, 3 µm, 5 µm or 10 µm. In at least one embodiment, the feature floor length 72 may range from 0% to 95% of the overall length of the bushing feature 60 or the circumference at the bushing shape distance 62, including approximately 50% in certain embodiments. Additional factors affecting selection of the feature depth 70 and bushing angle 58 include, but are not limited to, the intended operating pressures and speed of the external gear machine 100, the axial balance condition, and the lateral gap condition between the bushing 40 and the gear 10. For a given lateral bushing 40, the bushing feature 60 may be periodically repeated according to the formula 360 divided total number of the gear teeth 12 of the corresponding gear 10.

Figure 13A:
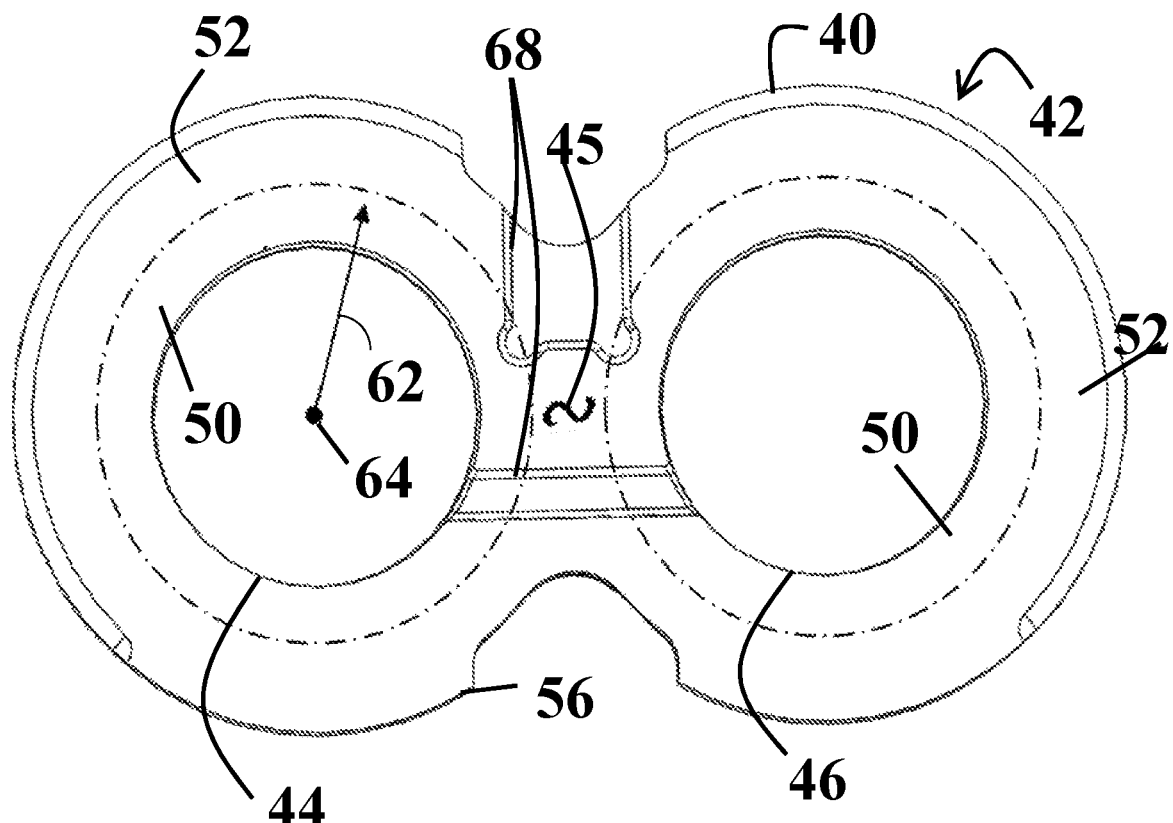
FIG. 13A shows a plan view of a lateral bushing of an EGM according to exemplary embodiments of the present disclosure and FIG. 13B illustrates a profile of the same.
Figure 13B:
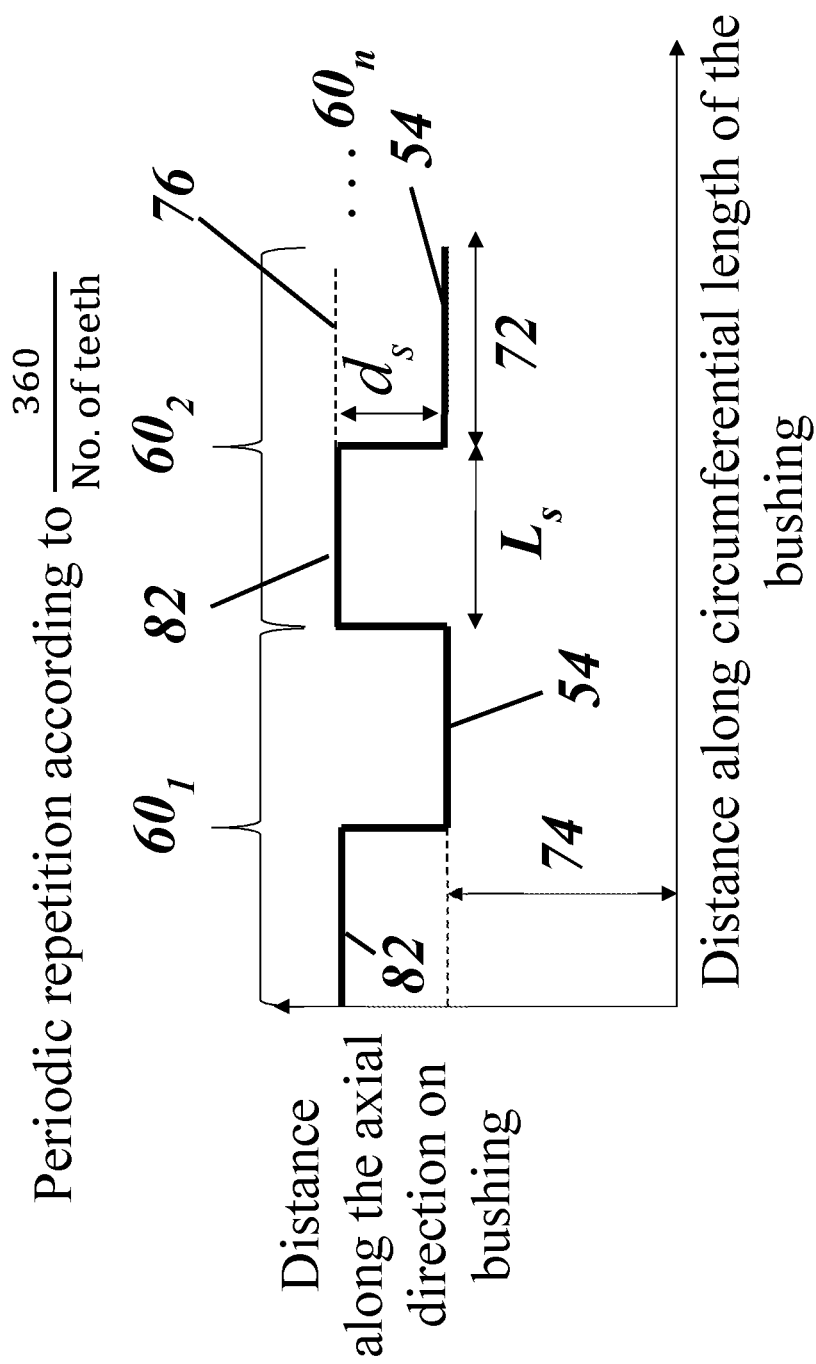

At least one additional embodiment of the lateral bushing 40 having alternative repeating bushing features 60 is shown in FIGS. 13A and 13B. As with previously described embodiments, the gear side 45 comprises a bushing base surface 50 and a bushing shaped surface 52 extending from radial bushing shape distance 62 to the bushing perimeter 56.

However, in this at least one embodiment, instead of the wedge and floor configuration previously described, the bushing feature 60 on the back side 42 of the bushing shaped surface 52 comprises one or more flat surfaces formed circumferentially in the bushing shaped surface 52. In perhaps the simplest configuration, the back side 42 of the bushing shaped surface 52 is flat and only differs from the bushing base surface 50 in that the bushing shaped surface 52 is recessed at a feature depth $d_s$ into the axial plane of the lateral bushing 40.

This concept may be employed to create a repeating pattern that extends radially across the bushing shaped surface 52 in the circumferential direction of the lateral bushing 40. For example, for a given lateral bushing 40, the bushing feature 60 may be periodically repeated according to the formula 360 divided by the total number of the gear teeth 12 of the corresponding gear 10.

FIG. 13B provides a graphical depiction of the parameters of one such embodiment. As shown in FIG. 13B, each iteration of the bushing feature 60 comprises a step configuration having a flat wall 82 on the plane 76 of the bushing base surface 50 and a feature floor 54 a feature depth $d_s$ below the plane 76 to a minimum bushing thickness 74. The flat wall 82 defines a wall length $L_s$ and, as with previous embodiments, the feature floor 54 defines feature floor length 72. The features $60_1$, $60_2$, . . . $60_n$ may be repeated (uniformly or otherwise) along the bushing shaped surface 52 in a radial fashion toward the bushing perimeter 56.

The parameters of the feature floor length 72, the wall length $L_s$, and the feature depth $d_s$ of the features $60_1$, $60_2$, . . . $60_n$ are wholly customizable and may be determined as appropriate for a given application of external gear machine 100 in which the lateral bushing 40 is employed. The parameters may vary periodically across the circumferential length of the bushing 40 and need not be the same across the various feature iterations.

Any feature depth $d_s$ may be between 0-500 µm (as desired) noting that, where a depth $d_s$ comprises 0 µm, the applicable feature floor 54 remains on-plane with the plane 76 of the bushing base surface 50. Likewise, as a feature depth $d_s$ is approaches 0 µm, the bushing feature 60 may only include a slight depression in the bushing shaped surface for that iteration of the feature 60. The feature floor length 72 and wall length $L_s$ are at least partially dependent on the circumferential length of the bushing shaped surface 52 and the number of feature 60 iterations employed. Where a single feature floor length 72 is between 0% and 100% of the overall circumferential length of the bushing feature 60, the bushing feature 60 defines the step configuration graphically depicted in FIG. 13B.

Similarly, the feature depth $d_s$ is at least partially limited by the thickness of the lateral bushing 40. In certain embodiments, the feature depth $d_s$ may be between about 0.1 µm and 500 µm. In at least one embodiment according to the present disclosure, the feature depth $d_s$ may range from approximately 1 µm to about 10 µm and, specifically, 1 µm, 3 µm, 5 µm or 10 µm. In at least one embodiment, the feature floor length 72 may range from 0% to 95% of the overall length of the bushing feature 60 or the circumference at the bushing shape distance 62, including approximately 50% in certain embodiments. Additional factors affecting selection of the feature depth $d_s$, feature floor length 72, and wall length $L_s$, include, but are not limited to, the intended operating pressures and speed of the external gear machine 100, the axial balance condition, and the lateral gap condition between the bushing 40 and the gear 10.

Figure 14A:
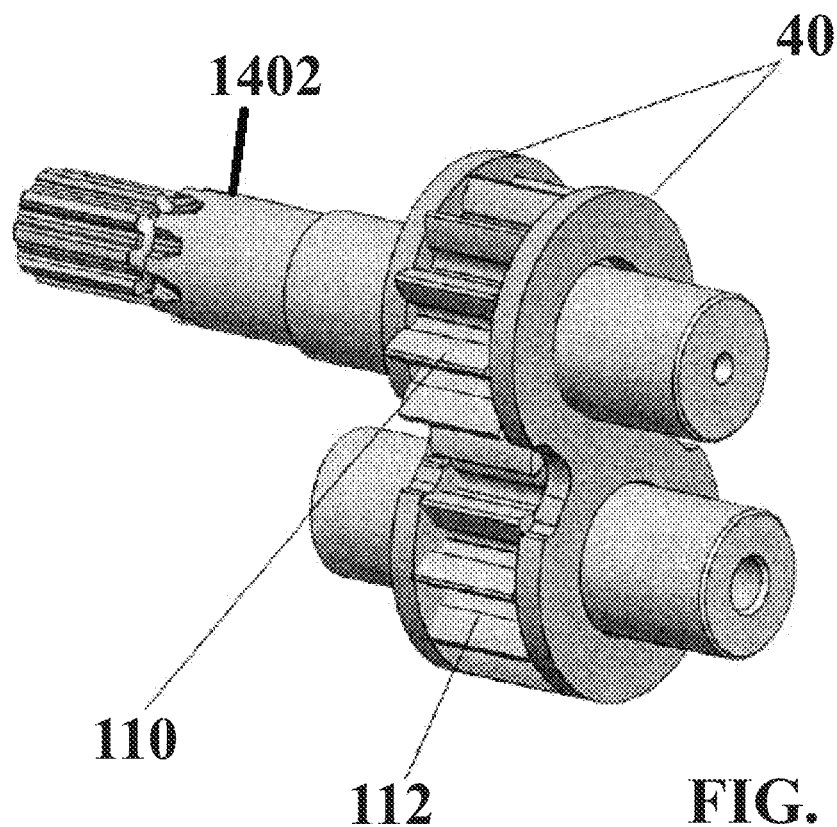
FIG. 14A shows a perspective view of a portion of an external gear machine according to exemplary embodiments of the present disclosure.
Figure 14B:
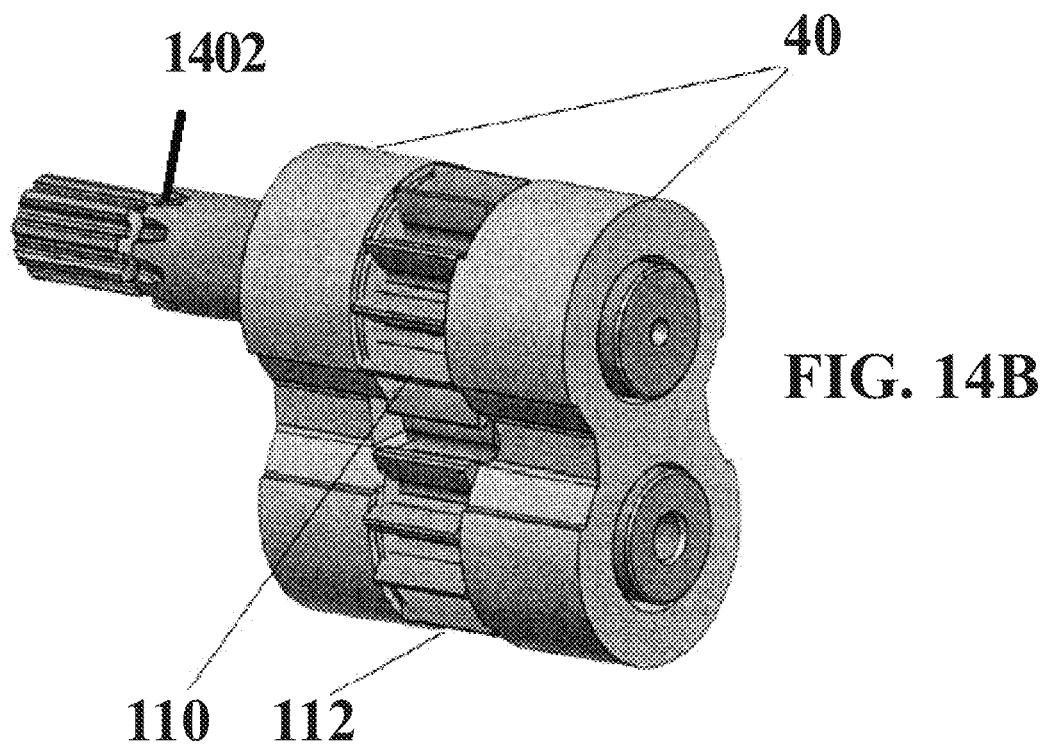
FIG. 14B shows a perspective view of a portion of an external gear machine according to exemplary embodiments of the present disclosure.

The bushing feature(s) 60 may be employed in different types of lateral bushings 40 depending on the application. As shown in FIG. 14A, the bushing feature 60 may be employed where the lateral bushings 40 are relatively thin pressure plates. As shown in FIG. 14B, the bushing feature 60 may be employed where the lateral bushings 40 are relative thick bearing blocks, which may provide additional structural support to the shaft 1402 of the gear 10. The lateral bushing 40 may be employed in a pair of lateral bushings 40 adjacent to each lateral side of the drive gear 110 and the corresponding slave gear 112.

The gear 10 including the gear tooth 12 having the shaped surface 22 and the lateral bushing 40 having the bushing shaped surface 52 may be formed of any suitable manufacturing process. As non-limiting examples, the gear 10 and lateral bushing 40 may be formed by casting, forging, machining, extrusion, powder metallurgy, blanking, and/or additive manufacturing (i.e. three-dimensional printing).

The balance area(s) of the lateral bushing 40 may vary depending on the chosen gear profile (e.g., the desired wedge depth and/or step profile) due to the additional hydrodynamic effects arising from the chosen surface shaping of the gears 10. In at least one embodiment, an axial balance optimization procedure for identifying such details on the balance area on the side of a lateral bushing opposing the gears (area and area centroid) accounts for at least two objective functions: 1) the opposing power losses in the lubrication gap due to both the viscous shear and lateral leakage; and 2) the gap nonuniformity index (GNI), a factor designed to avoid sharp contacts between the gears and the lateral bushing. Briefly, the GNI is associated with excessive relative tilt between the gears 10 and the lateral bushing 40. In determining an ideal configuration for a lateral bushing 40, the GNI factor assists with eliminating designs that can potentially lead to excessively sharp contacts and consequently result in wear. In at least one exemplary embodiment, the optimization algorithm generates different designs of the balance area using two design parameters; namely, the magnitude of the high-pressure balance area (labeled A in FIG. 2B and the Y coordinate of the high-pressure balance area (labeled A in FIG. 2B). These objective functions may be evaluated using various models under ranges of operating conditions, with an optimal balance area design ultimately achieved based on the refinement of successive design iterations and the analysis thereof.

As previously described, the microsurface shaping on the gear teeth 12 as described in the present disclosure is a unique approach and results in numerous advantages heretofore not available through conventional techniques. The microsurface shaping of the gear teeth 12 significantly improves the performance of the lateral lubricating interface 114 during operation of the external gear machine 10 in terms of both efficiency and wear. The microsurface shaping features of the present disclosure induce hydrodynamic effects in the lubricating gaps 114 that significantly alter the axial balance of the floating lateral bushings 40. For this reason, when introducing the various microsurface shaping design features described herein in different applications, it may be prudent to also recalculate the balance area(s) used to achieve axial balance of the lateral bushings 40.

To validate the performance of various embodiments of the presently disclosed microsurface shaping techniques, various computational models were utilized (e.g., a fluid dynamic model to analyze displacing action and the pressures within each tooth space volume and a model for studying the lubricating performance within the lubrication gaps). In sum, the results of such computational studies identified significant reductions in shear losses when the microshaped gears of the present disclosure were used as compared to conventionally designed gears, which were subsequently supported with corresponding experimental work. These details are reported in the Incorporated Publication incorporated herein by reference.

Improvement was also seen the minimum gap height delivered by the microshaped gears of the present disclosure as compared to those of conventional external gear machines without gear surface shaping, with the help of computational models described in the Incorporated Publication. Indeed, the surface shaping on the gears of the present disclosure facilitated lower wear on the lateral bushings and the gears as compared to conventional designs, and such gears exhibited improved mechanical efficiency over conventional models.

Finally, steady-state characterization tests were also performed to evaluate torque losses of both conventional external gear machines and external gear machines comprising the microshaped gear teeth surfaces of the present disclosure. A consistent reduction in the input torque required to drive the external gear pump was seen when using the microshaped gears hereof as compared to the corresponding conventional design at all the operating conditions of the reference unit reported in the Incorporated Publication. Accordingly, in application, the embodiments of the present disclosure are capable of improving the performance of an external gear pump by reducing various system losses and wear between components and, thus, improving the overall mechanical efficiency thereof.

While various embodiments of the present disclosure have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A gear for use in an external gear machine, the gear comprising a plurality of gear teeth, each gear tooth comprising a lateral surface defining a first peripheral tooth profile between a first edge, a second edge, and a distal end of the gear tooth, the lateral surface comprising:
a root surface in a first lateral plane,
a step surface extending between the root surface, the distal end, and the first edge, and
a shaped surface extending between the root surface, the distal end and the second edge, wherein at least a portion of the shaped surface extends away from the first lateral plane to form a first depth of between 0.1 microns and 500 microns between the first lateral plane and the portion of the shaped surface such that the first peripheral tooth profile along the second edge is below the first lateral plane of the gear tooth,
wherein the first edge and the second edge do not have the same configuration.

2. The gear of claim 1, wherein at least one gear tooth includes the shaped surface on each of its lateral surfaces.

3. The gear of claim 1, wherein each step surface comprises a flat surface in the first lateral plane and extends a first length from the first edge of the gear tooth to a lateral profile line of the lateral surface.

4. The gear of claim 3, wherein the shaped surface of each gear tooth extends from the lateral profile line to the second edge of the gear tooth and the step surface and the shaped surface form a pattern that repeats sequentially along the gear tooth.

5. The gear of claim 4, wherein the shaped surface of each gear tooth extends away from the lateral profile line at a 90° angle.

6. The gear of claim 4, wherein the first length comprises 50% or more of a width of the gear tooth.

7. The gear of claim 1, wherein the shaped surface extends away from the first lateral plane surface at a lateral shaping angle to form a wedge and the first depth comprises a maximum wedge depth at or near a trailing the second edge of the gear tooth.

8. The gear of claim 7, wherein the maximum wedge depth is within a range of 1-10 microns.

9. The gear of claim 7, wherein the first depth decreases along the lateral shaping angle of each gear tooth.

10. The gear of claim 1, wherein one or more dimensions of the shaped surface are calculated by dividing 360 by a total number of gear teeth of the gear.

11. An external gear machine comprising:
a first gear comprising a plurality of gear teeth, each gear tooth of the plurality of gear teeth comprising:
a lateral surface:
having at least a portion thereof in a first lateral plane,
defining a first peripheral tooth profile between a leading edge, a trailing edge, and a distal end of the gear tooth,
comprising a root surface in the first lateral plane, a step surface extending between the root surface, the distal end, and the leading edge, and a shaped surface extending between the root surface, the distal end and the trailing edge, and comprising the shaped surface extending away from the first lateral plane to form a depth in at least a portion of the lateral surface of the gear tooth such that the first peripheral tooth profile along the trailing edge is below the first lateral plane;
wherein the leading edge and the trailing edge do not have the same configuration and, in use, the leading edge is positioned in front of the trailing edge relative to a direction of rotation of the first gear; and
a first lateral bushing comprising:
at least one inner aperture formed therethrough,
a bushing base surface surrounding the at least one inner aperture and extending radially to a shape distance from a center of the at least one inner aperture,
wherein both the first gear and the first lateral bushing are positioned within a housing such that a lubricating gap is formed between the first gear and the first lateral bushing.

12. The external gear machine of claim 11, wherein the first lateral bushing further comprises a bushing shaped surface surrounding the bushing base surface and extending to a perimeter of the first lateral bushing, wherein the bushing shaped surface includes at least one bushing feature having an axial feature depth and a feature angle that form a pattern that periodically repeats circumferentially around the at least one inner aperture at the shape distance.

13. The external gear machine of claim 11, further comprising a second lateral bushing comprising:
at least one inner aperture formed therethrough;
a bushing base surface surrounding the at least one inner aperture and extending radially to a shape distance from a center of the at least one inner aperture; and
a bushing shaped surface surrounding the bushing base surface and extending to a perimeter of the second lateral bushing;
wherein the bushing shaped surface includes at least one bushing feature having an axial feature depth and a feature angle and the second lateral bushing is positioned within the housing such that a second lubricating gap is formed between the first gear and the second lateral bushing.

14. The external gear machine of claim 13, wherein the at least one feature angle comprises at or near a 90° angle, and the axial feature depth and the at least one feature angle form a pattern that periodically repeats circumferentially around the at least one inner aperture at the shape distance to form a tooth-like configuration.

15. The external gear machine of claim 13, wherein the at least one bushing feature of the second lateral bushing comprises a floor positioned at the axial feature depth.

16. The external gear machine of claim 11, wherein no portion of the shaped surfaces of the plurality of gear teeth of the first gear are in the first lateral plane of the first gear.

17. The external gear machine of claim 11, wherein the shaped surface of each gear tooth extends away from the lateral surface at a lateral shaping angle to form a wedge and the depth of each gear tooth comprises a maximum depth at or near the trailing edge of each gear tooth.

18. The external gear machine of claim 17, wherein the depth of each gear tooth decreases along the lateral shaping angle of each gear tooth to the maximum depth.

19. The external gear machine of claim 18, further comprising a second gear comprising a plurality of gear teeth, each gear tooth of the plurality of gear teeth comprising a lateral surface having at least a portion thereof in a first lateral plane, the lateral surface defining a first peripheral tooth profile extending between the leading edge and the trailing edge of the gear tooth and comprising a shaped surface extending away from the first lateral plane to form a depth below the first lateral plane on the trailing edge of the gear tooth, wherein the depth of each gear tooth of the second gear decreases along a lateral shaping angle of each gear tooth of the second gear;

wherein the first and second gears are positioned relative to each other such that a direction such that the leading edge of each gear tooth is positioned, relative to the trailing edge, toward a direction of intended rotation of the first and second gears within the housing.

20. The external gear machine of claim 11, further comprising a working fluid having a viscosity of at or greater than 0.5 cSt or at or greater than 1000 cSt.

21. A method for manufacturing an external gear machine comprising the steps of:

forming a first gear and a second gear, each for placement within a housing, the first gear coupled with a shaft configured for rotation in a direction, and both the first gear and second gear each comprising a plurality of gear teeth, each gear tooth of the plurality of gear teeth comprising a lateral surface defining a first peripheral tooth profile between a leading edge, a trailing edge, and a distal end of the gear tooth, the lateral surface comprising a root surface in a first lateral plane, a step surface extending between the root surface, the distal end, and the leading edge, and a shaped surface extending between the root surface, the distal end and the trailing edge, and away from the first lateral plane to form a depth in at least a portion of the gear tooth at or near the trailing edge, wherein the leading edge and the trailing edge of the gear tooth do not have the same configuration;

positioning the first gear and the second gear within the housing such that a direction of inclination of the shaped surfaces of the gear teeth of each of the first gear and the second gear correspond with, and the leading edges of the first and second gears are positioned in front of the respective trailing edges relative to, a direction of rotation of the first gear and the second gear within the housing; and positioning a first lateral bushing within the housing to form a first lubricating gap between the first lateral bushing and a first side of the first gear and a first side of the second gear;

positioning a second lateral bushing within the housing to form a second lubricating gap between the second lateral bushing and a second side of the first gear and the second gear;

wherein one or more dimensions of the shaped surface of the first gear are calculated by dividing 360 by a total number of gear teeth of the first gear.

22. The method of claim 21, wherein the depth of each shaped surface of the first gear and the second gear is between 0.1 microns and 500 microns.

* * * * *